(12) United States Patent
Chen et al.

(10) Patent No.: US 10,732,387 B2
(45) Date of Patent: Aug. 4, 2020

(54) OPTICAL IMAGING LENS

(71) Applicant: GENIUS ELECTRONIC OPTICAL (XIAMEN) CO., LTD., Xiamen, Fujian (CN)

(72) Inventors: Feng Chen, Fujian (CN); Yanxuan Yin, Fujian (CN); Ta-Cheng Fan, Taichung (TW)

(73) Assignee: GENIUS ELECTRONIC OPTICAL (XIAMEN) CO., LTD., Xiamen, Fujian (CN)

( * ) Notice: Subject to any disclaimer, the term of this patent is extended or adjusted under 35 U.S.C. 154(b) by 253 days.

(21) Appl. No.: 16/015,210

(22) Filed: Jun. 22, 2018

(65) Prior Publication Data

US 2019/0302416 A1 Oct. 3, 2019

(30) Foreign Application Priority Data

Mar. 30, 2018 (CN) .......................... 2018 1 0295011

(51) Int. Cl.
*G02B 9/62* (2006.01)
*G02B 13/00* (2006.01)

(52) U.S. Cl.
CPC .......... *G02B 13/0045* (2013.01); *G02B 9/62* (2013.01)

(58) Field of Classification Search
CPC .............................. G02B 13/0045; G02B 9/62
See application file for complete search history.

(56) References Cited

U.S. PATENT DOCUMENTS

| 2014/0092491 | A1* | 4/2014 | Hsu | .................... | G02B 13/0045 359/761 |
| 2015/0131169 | A1* | 5/2015 | Asami | ...................... | G02B 9/62 359/713 |
| 2018/0136443 | A1* | 5/2018 | Yin | .................... | G02B 27/0025 |

* cited by examiner

*Primary Examiner* — Darryl J Collins
*Assistant Examiner* — Journey F Sumlar
(74) *Attorney, Agent, or Firm* — JCIPRNET

(57) ABSTRACT

An optical imaging lens including a first lens element to a sixth lens element arranged in sequence from an object side to an image side along an optical axis is provided. The first lens element has negative refracting power, and a periphery region of the object-side surface thereof is convex. An optical axis region of the image-side surface of the second lens element is convex. An optical axis region of the object-side surface of the third lens element is concave. An optical axis region of the object-side surface of the fourth lens element is convex and a periphery region of the image-side surface thereof is concave. The optical imaging lens only has abovementioned six lens elements having refracting power, and satisfies the following condition expression: V4+V5+V6≤120.000. Furthermore, other optical imaging lenses are also provided.

20 Claims, 34 Drawing Sheets

| First embodiment |||||||
|---|---|---|---|---|---|---|
| EFL=2.056 mm ,HFOV=58.500°, System length= 5.065 mm, Fno=2.250, Image height= 2.883 mm |||||||
| Element | Surface | Radius(mm) | Thickness (mm) | Refractive index | Abbe number | Focal length (mm) |
| Object | | Infinity | Infinity | | | |
| First lens element 1 | Object-side Surface 15 | -12.518 | 0.369 | 1.545 | 55.987 | -3.884 |
| | Image-side Surface 16 | 2.581 | 0.566 | | | |
| Aperture 0 | | Infinity | -0.033 | | | |
| Second lens element 2 | Object-side Surface 25 | 2.766 | 0.530 | 1.545 | 55.987 | 2.354 |
| | Image-side Surface 26 | -2.241 | 0.036 | | | |
| Third lens element 3 | Object-side Surface 35 | -49.767 | 0.270 | 1.545 | 55.987 | 10.002 |
| | Image-side Surface 36 | -4.933 | 0.169 | | | |
| Fourth lens element 4 | Object-side Surface 45 | 19.337 | 0.288 | 1.661 | 20.373 | -8.092 |
| | Image-side Surface 46 | 4.195 | 0.144 | | | |
| Fifth lens element 5 | Object-side Surface 55 | -3.586 | 0.968 | 1.545 | 55.987 | 1.463 |
| | Image-side Surface 56 | -0.716 | 0.049 | | | |
| Sixth lens element 6 | Object-side Surface 65 | 2.806 | 0.491 | 1.642 | 22.409 | -1.743 |
| | Image-side Surface 66 | 0.749 | 0.600 | | | |
| Filter 9 | Object-side Surface 95 | Infinity | 0.210 | 1.517 | 64.167 | |
| | Image-side Surface 96 | Infinity | 0.406 | | | |
| | Image plane 99 | Infinity | | | | |

FIG. 8

| Surface | K | $a_2$ | $a_4$ | $a_6$ |
|---|---|---|---|---|
| 15 | 0.000000E+00 | 0.000000E+00 | 3.969400E-01 | -4.356696E-01 |
| 16 | 1.008224E+01 | 0.000000E+00 | 6.173483E-01 | -3.139105E-01 |
| 25 | -2.236474E+00 | 0.000000E+00 | 6.312633E-02 | 4.430308E-01 |
| 26 | 0.000000E+00 | 0.000000E+00 | -9.423555E-02 | -1.332896E+00 |
| 35 | 0.000000E+00 | 0.000000E+00 | -9.761569E-02 | -1.752734E+00 |
| 36 | 0.000000E+00 | 0.000000E+00 | 9.544980E-02 | -2.396362E+00 |
| 45 | 0.000000E+00 | 0.000000E+00 | 3.898681E-02 | -1.824982E+00 |
| 46 | 0.000000E+00 | 0.000000E+00 | 1.106615E-01 | -6.997041E-01 |
| 55 | 0.000000E+00 | 0.000000E+00 | 2.847457E-01 | -4.193937E-01 |
| 56 | -2.229300E+00 | 0.000000E+00 | 2.690065E-01 | -1.173129E+00 |
| 65 | -5.105597E+01 | 0.000000E+00 | 8.999369E-02 | -6.569144E-01 |
| 66 | -5.568624E+00 | 0.000000E+00 | -1.078144E-01 | 1.818877E-02 |
| Surface | $a_8$ | $a_{10}$ | $a_{12}$ | $a_{14}$ |
| 15 | 4.762269E-01 | -3.855026E-01 | 2.012629E-01 | -7.632581E-02 |
| 16 | -1.053836E+00 | 8.590201E+00 | -2.056128E+01 | 2.262702E+01 |
| 25 | -2.459966E+00 | 1.403917E+00 | 3.729847E+00 | 3.098002E+01 |
| 26 | 6.951975E+00 | -2.203242E+01 | 4.039238E+01 | -4.558143E+01 |
| 35 | 6.950969E+00 | -1.572258E+01 | 2.029388E+01 | -1.824918E+01 |
| 36 | 8.808750E+00 | -1.738797E+01 | 2.105158E+01 | -1.590531E+01 |
| 45 | 5.546987E+00 | -7.837817E+00 | 5.349679E+00 | -1.052119E+00 |
| 46 | 1.236142E+00 | -6.173668E-01 | -7.249997E-01 | 1.184762E+00 |
| 55 | 8.590258E-01 | -1.756885E+00 | 2.531685E+00 | -2.178591E+00 |
| 56 | 2.913952E+00 | -4.766982E+00 | 5.267890E+00 | -3.845655E+00 |
| 65 | 1.219301E+00 | -1.508175E+00 | 1.229397E+00 | -6.482899E-01 |
| 66 | 2.753892E-02 | -3.138082E-02 | 1.663458E-02 | -5.274915E-03 |
| Surface | $a_{16}$ | $a_{18}$ | $a_{20}$ | |
| 15 | 1.584274E-02 | | | |
| 16 | -1.149888E+01 | | | |
| 25 | -9.159111E+01 | | | |
| 26 | 2.210611E+01 | | | |
| 35 | 1.062040E+01 | | | |
| 36 | 5.987582E+00 | | | |
| 45 | -6.495597E-01 | | | |
| 46 | -6.418680E-01 | 1.261753E-01 | | |
| 55 | 1.006228E+00 | -1.936006E-01 | | |
| 56 | 1.763991E+00 | -4.558772E-01 | 5.012668E-02 | |
| 65 | 2.082965E-01 | -3.653010E-02 | 2.696423E-03 | |
| 66 | 1.009047E-03 | -1.075684E-04 | 4.916853E-06 | |

FIG. 9

| Second embodiment | | | | | | |
|---|---|---|---|---|---|---|
| EFL=2.147 mm ,HFOV=58.500° ,System length= 5.319 mm, Fno=2.250, Image height= 2.884 mm | | | | | | |
| Element | Surface | Radius(mm) | Thickness (mm) | Refractive index | Abbe number | Focal length (mm) |
| Object | | Infinity | Infinity | | | |
| First lens element 1 | Object-side Surface 15 | -5.044 | 0.444 | 1.545 | 55.987 | -2.833 |
| | Image-side Surface 16 | 2.302 | 0.360 | | | |
| Aperture 0 | | Infinity | -0.047 | | | |
| Second lens element 2 | Object-side Surface 25 | 2.828 | 0.652 | 1.545 | 55.987 | 2.279 |
| | Image-side Surface 26 | -2.043 | 0.053 | | | |
| Third lens element 3 | Object-side Surface 35 | -12.886 | 0.362 | 1.545 | 55.987 | 6.903 |
| | Image-side Surface 36 | -2.946 | 0.101 | | | |
| Fourth lens element 4 | Object-side Surface 45 | 10.543 | 0.315 | 1.661 | 20.373 | -7.518 |
| | Image-side Surface 46 | 3.358 | 0.262 | | | |
| Fifth lens element 5 | Object-side Surface 55 | -3.217 | 0.866 | 1.545 | 55.987 | 1.561 |
| | Image-side Surface 56 | -0.738 | 0.033 | | | |
| Sixth lens element 6 | Object-side Surface 65 | 1.522 | 0.373 | 1.642 | 22.409 | -1.997 |
| | Image-side Surface 66 | 0.632 | 0.600 | | | |
| Filter 9 | Object-side Surface 95 | Infinity | 0.210 | 1.517 | 64.167 | |
| | Image-side Surface 96 | Infinity | 0.736 | | | |
| | Image plane 99 | Infinity | | | | |

FIG. 12

| Surface | K | $a_2$ | $a_4$ | $a_6$ |
|---|---|---|---|---|
| 15 | 0.000000E+00 | 0.000000E+00 | 3.666743E-01 | -4.603513E-01 |
| 16 | 9.808595E+00 | 0.000000E+00 | 6.804963E-01 | -5.449048E-01 |
| 25 | 3.848275E+00 | 0.000000E+00 | 9.811039E-02 | 4.087369E-01 |
| 26 | 0.000000E+00 | 0.000000E+00 | -5.018295E-02 | -1.272017E+00 |
| 35 | 0.000000E+00 | 0.000000E+00 | -8.355769E-02 | -1.861514E+00 |
| 36 | 0.000000E+00 | 0.000000E+00 | 5.467646E-03 | -2.398404E+00 |
| 45 | 0.000000E+00 | 0.000000E+00 | 5.857908E-02 | -1.837831E+00 |
| 46 | 0.000000E+00 | 0.000000E+00 | 1.114493E-01 | -7.004466E-01 |
| 55 | 0.000000E+00 | 0.000000E+00 | 2.734088E-01 | -4.266060E-01 |
| 56 | -2.565029E+00 | 0.000000E+00 | 2.695511E-01 | -1.168218E+00 |
| 65 | -1.653409E+01 | 0.000000E+00 | 9.231638E-02 | -6.502648E-01 |
| 66 | -4.705914E+00 | 0.000000E+00 | -1.147531E-01 | 2.042814E-02 |
| Surface | $a_8$ | $a_{10}$ | $a_{12}$ | $a_{14}$ |
| 15 | 4.693425E-01 | -3.812190E-01 | 2.091384E-01 | -7.317552E-02 |
| 16 | -1.094320E+00 | 8.913132E+00 | -2.102239E+01 | 2.074819E+01 |
| 25 | -2.120333E+00 | 1.507165E+00 | 8.673613E-01 | 2.798834E+01 |
| 26 | 6.769577E+00 | -2.214297E+01 | 4.106756E+01 | -4.422550E+01 |
| 35 | 6.907806E+00 | -1.597024E+01 | 1.980280E+01 | -1.780243E+01 |
| 36 | 8.642956E+00 | -1.744918E+01 | 2.121548E+01 | -1.572745E+01 |
| 45 | 5.587653E+00 | -7.855648E+00 | 5.254011E+00 | -1.079774E+00 |
| 46 | 1.229994E+00 | -6.195332E-01 | -7.232897E-01 | 1.187421E+00 |
| 55 | 8.606555E-01 | -1.754189E+00 | 2.533370E+00 | -2.177961E+00 |
| 56 | 2.914503E+00 | -4.768070E+00 | 5.267141E+00 | -3.845902E+00 |
| 65 | 1.222199E+00 | -1.506962E+00 | 1.229826E+00 | -6.481910E-01 |
| 66 | 2.713826E-02 | -3.147242E-02 | 1.663887E-02 | -5.269416E-03 |
| Surface | $a_{16}$ | $a_{18}$ | $a_{20}$ | |
| 15 | 1.290347E-02 | | | |
| 16 | -1.573620E+01 | | | |
| 25 | -6.584218E+01 | | | |
| 26 | 2.329004E+01 | | | |
| 35 | 1.286520E+01 | | | |
| 36 | 5.733227E+00 | | | |
| 45 | -4.073974E-01 | | | |
| 46 | -6.410535E-01 | 1.245354E-01 | | |
| 55 | 1.005961E+00 | -1.942088E-01 | | |
| 56 | 1.763967E+00 | -4.558652E-01 | 5.011697E-02 | |
| 65 | 2.082667E-01 | -3.658223E-02 | 2.658038E-03 | |
| 66 | 1.010076E-03 | -1.075401E-04 | 4.842499E-06 | |

FIG. 13

| Third embodiment | | | | | | |
|---|---|---|---|---|---|---|
| EFL=2.022 mm ,HFOV=58.519° ,System length= 5.226 mm, Fno=2.250, Image height= 3.030 mm | | | | | | |
| Element | Surface | Radius(mm) | Thickness (mm) | Refractive index | Abbe number | Focal length (mm) |
| Object | | Infinity | Infinity | | | |
| First lens element 1 | Object-side Surface 15 | -7.723 | 0.360 | 1.545 | 55.987 | -3.823 |
| | Image-side Surface 16 | 2.910 | 0.594 | | | |
| Aperture 0 | | Infinity | 0.013 | | | |
| Second lens element 2 | Object-side Surface 25 | 2.703 | 0.396 | 1.545 | 55.987 | 3.019 |
| | Image-side Surface 26 | -4.009 | 0.074 | | | |
| Third lens element 3 | Object-side Surface 35 | -21.007 | 0.354 | 1.545 | 55.987 | 3.599 |
| | Image-side Surface 36 | -1.808 | 0.085 | | | |
| Fourth lens element 4 | Object-side Surface 45 | 7.500 | 0.313 | 1.661 | 20.373 | -6.313 |
| | Image-side Surface 46 | 2.652 | 0.304 | | | |
| Fifth lens element 5 | Object-side Surface 55 | -2.418 | 1.057 | 1.545 | 55.987 | 1.164 |
| | Image-side Surface 56 | -0.581 | 0.041 | | | |
| Sixth lens element 6 | Object-side Surface 65 | 1.677 | 0.330 | 1.642 | 22.409 | -1.317 |
| | Image-side Surface 66 | 0.522 | 0.600 | | | |
| Filter 9 | Object-side Surface 95 | Infinity | 0.210 | 1.517 | 64.167 | |
| | Image-side Surface 96 | Infinity | 0.494 | | | |
| | Image plane 99 | Infinity | | | | |

FIG. 16

| Surface | K | $a_2$ | $a_4$ | $a_6$ |
|---|---|---|---|---|
| 15 | 0.000000E+00 | 0.000000E+00 | 3.316307E-01 | -3.746923E-01 |
| 16 | 1.163167E+01 | 0.000000E+00 | 4.575479E-01 | -3.206089E-02 |
| 25 | -3.198916E-01 | 0.000000E+00 | 5.718367E-02 | 1.970396E-01 |
| 26 | 0.000000E+00 | 0.000000E+00 | 5.029372E-02 | -1.340488E+00 |
| 35 | 0.000000E+00 | 0.000000E+00 | 8.690714E-02 | -1.753251E+00 |
| 36 | 0.000000E+00 | 0.000000E+00 | 2.317430E-01 | -2.491145E+00 |
| 45 | 0.000000E+00 | 0.000000E+00 | 1.249437E-01 | -2.004436E+00 |
| 46 | 0.000000E+00 | 0.000000E+00 | 9.036331E-02 | -6.891031E-01 |
| 55 | 0.000000E+00 | 0.000000E+00 | 1.812454E-01 | -3.240003E-01 |
| 56 | -2.534924E+00 | 0.000000E+00 | 2.545137E-01 | -1.236097E+00 |
| 65 | -8.579301E+01 | 0.000000E+00 | 1.593118E-01 | -7.012119E-01 |
| 66 | -5.917099E+00 | 0.000000E+00 | -7.693301E-02 | -3.566564E-03 |
| Surface | $a_8$ | $a_{10}$ | $a_{12}$ | $a_{14}$ |
| 15 | 4.260060E-01 | -3.821521E-01 | 2.239825E-01 | -7.769066E-02 |
| 16 | -1.761724E+00 | 8.767070E+00 | -1.995106E+01 | 2.385000E+01 |
| 25 | -1.312706E+00 | 3.252954E+00 | -3.805513E+00 | 3.235642E+00 |
| 26 | 6.205509E+00 | -2.199979E+01 | 4.352563E+01 | -4.056810E+01 |
| 35 | 5.703420E+00 | -1.618473E+01 | 2.401688E+01 | -1.360803E+01 |
| 36 | 8.399559E+00 | -1.750823E+01 | 2.150933E+01 | -1.418441E+01 |
| 45 | 5.586380E+00 | -7.755956E+00 | 5.327481E+00 | -1.181623E+00 |
| 46 | 1.229360E+00 | -6.258960E-01 | -7.221115E-01 | 1.194149E+00 |
| 55 | 8.288774E-01 | -1.729495E+00 | 2.538487E+00 | -2.195942E+00 |
| 56 | 2.956453E+00 | -4.777256E+00 | 5.268085E+00 | -3.844769E+00 |
| 65 | 1.235118E+00 | -1.494182E+00 | 1.214346E+00 | -6.430023E-01 |
| 66 | 3.381231E-02 | -3.185891E-02 | 1.650802E-02 | -5.261428E-03 |
| Surface | $a_{16}$ | $a_{18}$ | $a_{20}$ | |
| 15 | 1.184745E-02 | | | |
| 16 | -1.218557E+01 | | | |
| 25 | -5.697509E+00 | | | |
| 26 | 1.213225E+01 | | | |
| 35 | 1.628527E+00 | | | |
| 36 | 4.165922E+00 | | | |
| 45 | -3.423422E-01 | | | |
| 46 | -6.355160E-01 | 1.213873E-01 | | |
| 55 | 9.994461E-01 | -1.863493E-01 | | |
| 56 | 1.763470E+00 | -4.561981E-01 | 5.035532E-02 | |
| 65 | 2.099301E-01 | -3.797432E-02 | 2.895609E-03 | |
| 66 | 1.013280E-03 | -1.076244E-04 | 4.833215E-06 | |

FIG. 17

| Fourth embodiment ||||||
|---|---|---|---|---|---|
| EFL=1.939 mm ,HFOV=58.519° ,System length= 5.247 mm, Fno=2.250, Image height= 2.836 mm ||||||
| Element | Surface | Radius(mm) | Thickness (mm) | Refractive index | Abbe number | Focal length (mm) |
| Object | | Infinity | Infinity | | | |
| First lens element 1 | Object-side Surface 15 | -6.963 | 0.450 | 1.545 | 55.987 | -4.064 |
| | Image-side Surface 16 | 3.333 | 0.829 | | | |
| Aperture 0 | | Infinity | -0.036 | | | |
| Second lens element 2 | Object-side Surface 25 | 2.276 | 0.712 | 1.545 | 55.987 | 2.123 |
| | Image-side Surface 26 | -2.103 | 0.032 | | | |
| Third lens element 3 | Object-side Surface 35 | -88.016 | 0.318 | 1.545 | 55.987 | 5.971 |
| | Image-side Surface 36 | -3.149 | 0.039 | | | |
| Fourth lens element 4 | Object-side Surface 45 | 7.078 | 0.228 | 1.661 | 20.373 | -4.965 |
| | Image-side Surface 46 | 2.227 | 0.486 | | | |
| Fifth lens element 5 | Object-side Surface 55 | -2.012 | 0.680 | 1.545 | 55.987 | 1.288 |
| | Image-side Surface 56 | -0.583 | 0.038 | | | |
| Sixth lens element 6 | Object-side Surface 65 | 2.200 | 0.354 | 1.642 | 22.409 | -1.411 |
| | Image-side Surface 66 | 0.605 | 0.600 | | | |
| Filter 9 | Object-side Surface 95 | Infinity | 0.210 | 1.517 | 64.167 | |
| | Image-side Surface 96 | Infinity | 0.308 | | | |
| | Image plane 99 | Infinity | | | | |

FIG. 20

| Surface | K | $a_2$ | $a_4$ | $a_6$ |
|---|---|---|---|---|
| 15 | 0.000000E+00 | 0.000000E+00 | 2.662981E-01 | -2.587471E-01 |
| 16 | 1.163167E+01 | 0.000000E+00 | 3.950588E-01 | -2.586125E-01 |
| 25 | -3.198916E-01 | 0.000000E+00 | 1.949996E-02 | 3.085583E-01 |
| 26 | 0.000000E+00 | 0.000000E+00 | -1.535798E-01 | -4.115963E-01 |
| 35 | 0.000000E+00 | 0.000000E+00 | -3.533086E-01 | -6.480138E-01 |
| 36 | 0.000000E+00 | 0.000000E+00 | -3.642243E-01 | -1.065196E+00 |
| 45 | 0.000000E+00 | 0.000000E+00 | -2.396890E-01 | -5.781902E-01 |
| 46 | 0.000000E+00 | 0.000000E+00 | -6.214579E-02 | -1.008580E-01 |
| 55 | 0.000000E+00 | 0.000000E+00 | -8.053596E-02 | 9.882393E-02 |
| 56 | -2.534924E+00 | 0.000000E+00 | 1.099051E-01 | -1.019279E+00 |
| 65 | -8.579301E+01 | 0.000000E+00 | 1.797587E-01 | -7.840380E-01 |
| 66 | -5.917099E+00 | 0.000000E+00 | -8.106284E-02 | -2.022479E-02 |
| Surface | $a_8$ | $a_{10}$ | $a_{12}$ | $a_{14}$ |
| 15 | 2.342783E-01 | -1.558032E-01 | 6.502934E-02 | -1.555173E-02 |
| 16 | -1.649999E-01 | 1.973812E+00 | -4.193995E+00 | 4.032481E+00 |
| 25 | -3.784569E+00 | 2.936764E+01 | -1.444645E+02 | 3.743166E+02 |
| 26 | 3.441311E+00 | -1.566179E+01 | 3.680803E+01 | -4.451417E+01 |
| 35 | 1.953831E+00 | -9.651151E+00 | 2.674831E+01 | -4.387352E+01 |
| 36 | 5.756853E+00 | -1.491074E+01 | 2.055405E+01 | -1.606150E+01 |
| 45 | 4.062045E+00 | -8.943905E+00 | 8.458436E+00 | -2.659084E+00 |
| 46 | 4.428152E-01 | -4.241451E-01 | -5.570419E-01 | 1.288926E+00 |
| 55 | 1.350171E-01 | -1.505889E+00 | 2.801715E+00 | -2.035839E+00 |
| 56 | 2.640970E+00 | -4.584680E+00 | 5.282305E+00 | -3.950990E+00 |
| 65 | 1.310351E+00 | -1.533059E+00 | 1.233939E+00 | -6.473471E-01 |
| 66 | 4.300453E-02 | -3.121662E-02 | 1.475207E-02 | -4.809516E-03 |
| Surface | $a_{16}$ | $a_{18}$ | $a_{20}$ | |
| 15 | 1.630240E-03 | | | |
| 16 | -1.582307E+00 | | | |
| 25 | -3.876551E+02 | | | |
| 26 | 2.079194E+01 | | | |
| 35 | 3.147048E+01 | | | |
| 36 | 6.374661E+00 | | | |
| 45 | -4.683203E-01 | | | |
| 46 | -8.445665E-01 | 1.838397E-01 | | |
| 55 | 6.861872E-01 | -1.109029E-01 | | |
| 56 | 1.760276E+00 | -3.400858E-01 | -1.644391E-03 | |
| 65 | 2.077245E-01 | -3.664987E-02 | 2.710723E-03 | |
| 66 | 1.006903E-03 | -1.205336E-04 | 6.287979E-06 | |

FIG. 21

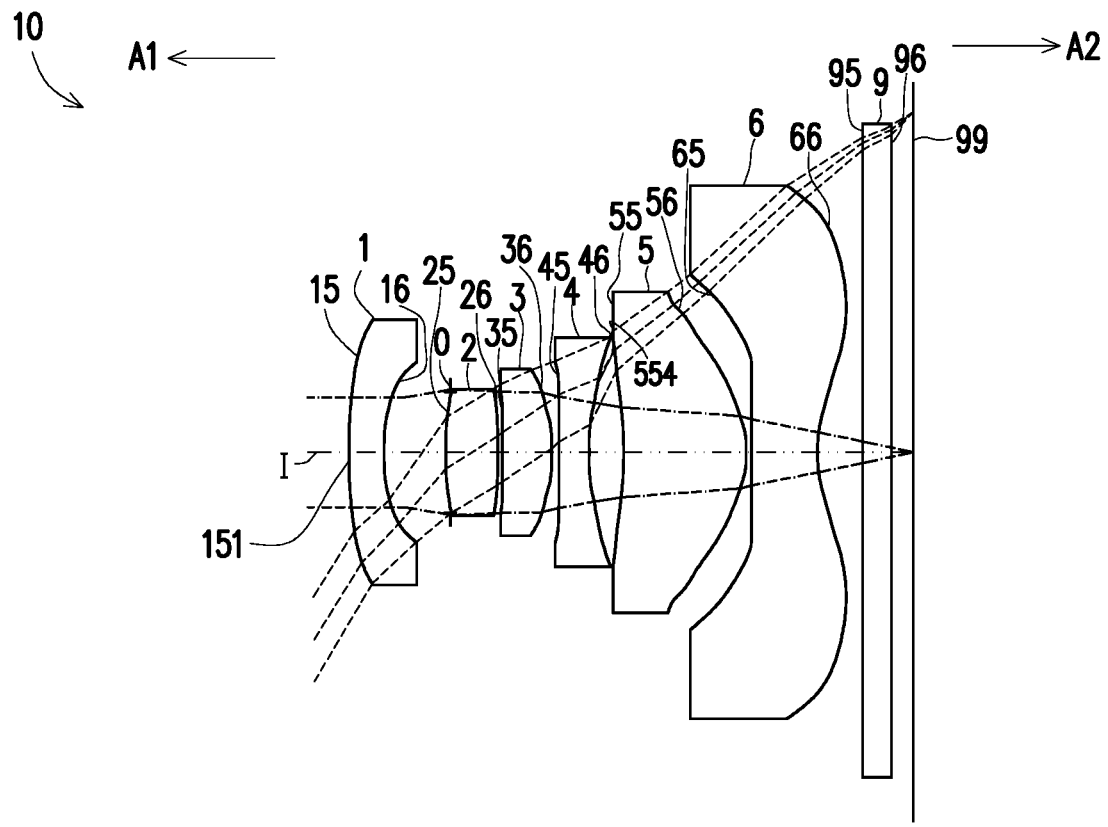
FIG. 22
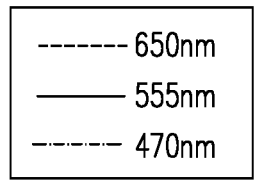
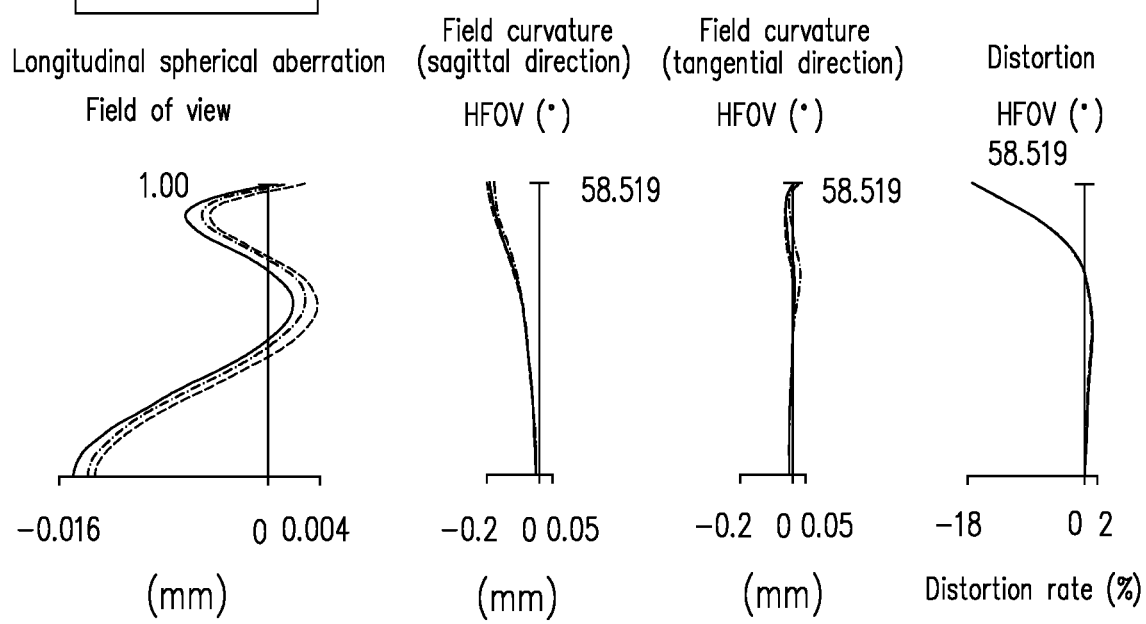
FIG. 23A   FIG. 23B   FIG. 23C   FIG. 23D

| Fifth embodiment | | | | | | |
|---|---|---|---|---|---|---|
| EFL=2.046 mm ,HFOV=58.519° ,System length= 4.643 mm, Fno=2.250, Image height= 2.783 mm | | | | | | |
| Element | Surface | Radius(mm) | Thickness (mm) | Refractive index | Abbe number | Focal length (mm) |
| Object | | Infinity | Infinity | | | |
| First lens element 1 | Object-side Surface 15 | 230.330 | 0.288 | 1.545 | 55.987 | -5.210 |
| | Image-side Surface 16 | 2.810 | 0.542 | | | |
| Aperture 0 | | Infinity | -0.045 | | | |
| Second lens element 2 | Object-side Surface 25 | 2.542 | 0.441 | 1.545 | 55.987 | 2.912 |
| | Image-side Surface 26 | -3.989 | 0.033 | | | |
| Third lens element 3 | Object-side Surface 35 | -100.000 | 0.408 | 1.545 | 55.987 | 2.783 |
| | Image-side Surface 36 | -1.500 | 0.038 | | | |
| Fourth lens element 4 | Object-side Surface 45 | 5.217 | 0.266 | 1.661 | 20.373 | -5.620 |
| | Image-side Surface 46 | 2.137 | 0.285 | | | |
| Fifth lens element 5 | Object-side Surface 55 | -3.001 | 1.007 | 1.545 | 55.987 | 1.923 |
| | Image-side Surface 56 | -0.871 | 0.038 | | | |
| Sixth lens element 6 | Object-side Surface 65 | 5.894 | 0.551 | 1.642 | 22.409 | -1.947 |
| | Image-side Surface 66 | 1.000 | 0.400 | | | |
| Filter 9 | Object-side Surface 95 | Infinity | 0.210 | 1.517 | 64.167 | |
| | Image-side Surface 96 | Infinity | 0.179 | | | |
| | Image plane 99 | Infinity | | | | |

FIG. 24

| Surface | K | $a_2$ | $a_4$ | $a_6$ |
|---|---|---|---|---|
| 15 | 0.000000E+00 | 0.000000E+00 | 3.453580E-01 | -3.847174E-01 |
| 16 | 1.163167E+01 | 0.000000E+00 | 5.079490E-01 | -1.974404E-01 |
| 25 | -3.198916E-01 | 0.000000E+00 | 4.569515E-02 | 1.164743E-01 |
| 26 | 0.000000E+00 | 0.000000E+00 | 1.618036E-01 | -1.534354E+00 |
| 35 | 0.000000E+00 | 0.000000E+00 | 2.081803E-01 | -1.694139E+00 |
| 36 | 0.000000E+00 | 0.000000E+00 | 2.186160E-01 | -2.238387E+00 |
| 45 | 0.000000E+00 | 0.000000E+00 | 7.729033E-02 | -1.882650E+00 |
| 46 | 0.000000E+00 | 0.000000E+00 | 7.988093E-02 | -6.972226E-01 |
| 55 | 0.000000E+00 | 0.000000E+00 | 1.976493E-01 | -3.662611E-01 |
| 56 | -2.534924E+00 | 0.000000E+00 | 2.443052E-01 | -1.192179E+00 |
| 65 | -8.579301E+01 | 0.000000E+00 | -1.422476E-03 | -6.262914E-01 |
| 66 | -5.917099E+00 | 0.000000E+00 | -9.979038E-02 | 1.058095E-02 |
| Surface | $a_8$ | $a_{10}$ | $a_{12}$ | $a_{14}$ |
| 15 | 4.492399E-01 | -3.974121E-01 | 2.055859E-01 | -7.090408E-02 |
| 16 | -1.259094E+00 | 8.221512E+00 | -2.002963E+01 | 2.466526E+01 |
| 25 | -1.189879E+00 | 3.990028E+00 | -7.324553E+00 | -3.181205E+00 |
| 26 | 6.130422E+00 | -2.117245E+01 | 4.381796E+01 | -4.215856E+01 |
| 35 | 5.811970E+00 | -1.591113E+01 | 2.485173E+01 | -1.405970E+01 |
| 36 | 8.386877E+00 | -1.766685E+01 | 2.132920E+01 | -1.470940E+01 |
| 45 | 5.484521E+00 | -8.014763E+00 | 5.325976E+00 | -5.358097E-01 |
| 46 | 1.232492E+00 | -6.375301E-01 | -7.522368E-01 | 1.209323E+00 |
| 55 | 8.401471E-01 | -1.767014E+00 | 2.543732E+00 | -2.170093E+00 |
| 56 | 2.915270E+00 | -4.761244E+00 | 5.269165E+00 | -3.847012E+00 |
| 65 | 1.220614E+00 | -1.506974E+00 | 1.230615E+00 | -6.477986E-01 |
| 66 | 2.942098E-02 | -3.133966E-02 | 1.660806E-02 | -5.277167E-03 |
| Surface | $a_{16}$ | $a_{18}$ | $a_{20}$ | |
| 15 | 1.492495E-02 | | | |
| 16 | -1.371977E+01 | | | |
| 25 | 1.871534E+01 | | | |
| 26 | 1.165478E+01 | | | |
| 35 | -5.780185E-01 | | | |
| 36 | 5.523443E+00 | | | |
| 45 | -9.743005E-01 | | | |
| 46 | -5.893040E-01 | 9.189146E-02 | | |
| 55 | 1.006677E+00 | -1.956658E-01 | | |
| 56 | 1.762675E+00 | -4.561685E-01 | 5.065821E-02 | |
| 65 | 2.083795E-01 | -3.657752E-02 | 2.633356E-03 | |
| 66 | 1.009575E-03 | -1.074249E-04 | 4.891859E-06 | |

FIG. 25

| Sixth embodiment | | | | | | |
|---|---|---|---|---|---|---|
| EFL=2.237 mm ,HFOV=58.519° ,System length= 5.677 mm, Fno=2.250, Image height= 2.922 mm | | | | | | |
| Element | Surface | Radius(mm) | Thickness (mm) | Refractive index | Abbe number | Focal length (mm) |
| Object | | Infinity | Infinity | | | |
| First lens element 1 | Object-side Surface 15 | -4.230 | 0.456 | 1.545 | 55.987 | -2.990 |
| | Image-side Surface 16 | 2.762 | 0.593 | | | |
| Aperture 0 | | Infinity | -0.076 | | | |
| Second lens element 2 | Object-side Surface 25 | 2.989 | 0.516 | 1.545 | 55.987 | 2.409 |
| | Image-side Surface 26 | -2.207 | 0.065 | | | |
| Third lens element 3 | Object-side Surface 35 | -13.210 | 0.510 | 1.545 | 55.987 | 3.346 |
| | Image-side Surface 36 | -1.628 | 0.010 | | | |
| Fourth lens element 4 | Object-side Surface 45 | 4.877 | 0.269 | 1.661 | 20.373 | -5.776 |
| | Image-side Surface 46 | 2.105 | 0.365 | | | |
| Fifth lens element 5 | Object-side Surface 55 | -1.548 | 0.499 | 1.545 | 55.987 | 4.286 |
| | Image-side Surface 56 | -1.038 | 0.213 | | | |
| Sixth lens element 6 | Object-side Surface 65 | 9.220 | 1.048 | 1.642 | 22.409 | -4.645 |
| | Image-side Surface 66 | 2.166 | 0.600 | | | |
| Filter 9 | Object-side Surface 95 | Infinity | 0.210 | 1.517 | 64.167 | |
| | Image-side Surface 96 | Infinity | 0.401 | | | |
| | Image plane 99 | Infinity | | | | |

FIG. 28

| Surface | K | $a_2$ | $a_4$ | $a_6$ |
|---|---|---|---|---|
| 15 | 0.000000E+00 | 0.000000E+00 | 3.854062E-01 | -4.443805E-01 |
| 16 | 1.163167E+01 | 0.000000E+00 | 6.978133E-01 | -4.721215E-01 |
| 25 | -3.198916E-01 | 0.000000E+00 | 1.169653E-01 | 2.298062E-01 |
| 26 | 0.000000E+00 | 0.000000E+00 | 1.005154E-01 | -1.271734E+00 |
| 35 | 0.000000E+00 | 0.000000E+00 | 3.127467E-02 | -1.682368E+00 |
| 36 | 0.000000E+00 | 0.000000E+00 | 1.054833E-01 | -2.428424E+00 |
| 45 | 0.000000E+00 | 0.000000E+00 | 7.459192E-02 | -1.919069E+00 |
| 46 | 0.000000E+00 | 0.000000E+00 | 1.060327E-01 | -7.253559E-01 |
| 55 | 0.000000E+00 | 0.000000E+00 | 3.637829E-01 | -3.844352E-01 |
| 56 | -2.534924E+00 | 0.000000E+00 | 2.282169E-01 | -1.119716E+00 |
| 65 | -8.579301E+01 | 0.000000E+00 | 5.511669E-02 | -6.377397E-01 |
| 66 | -5.917099E+00 | 0.000000E+00 | -9.686591E-02 | 1.296731E-02 |
| Surface | $a_8$ | $a_{10}$ | $a_{12}$ | $a_{14}$ |
| 15 | 4.564628E-01 | -3.789190E-01 | 2.123388E-01 | -7.273844E-02 |
| 16 | -9.259015E-01 | 8.540176E+00 | -2.076315E+01 | 2.351603E+01 |
| 25 | -1.196524E+00 | 3.337159E+00 | -4.899078E+00 | 5.900606E-01 |
| 26 | 6.370297E+00 | -2.167921E+01 | 4.262266E+01 | -4.292163E+01 |
| 35 | 5.898184E+00 | -1.614132E+01 | 2.392335E+01 | -1.416649E+01 |
| 36 | 8.711489E+00 | -1.755176E+01 | 2.121898E+01 | -1.443810E+01 |
| 45 | 5.567606E+00 | -7.736090E+00 | 5.325920E+00 | -1.238245E+00 |
| 46 | 1.240111E+00 | -6.197619E-01 | -7.199426E-01 | 1.189955E+00 |
| 55 | 8.704773E-01 | -1.758137E+00 | 2.533317E+00 | -2.177127E+00 |
| 56 | 2.894004E+00 | -4.766345E+00 | 5.273077E+00 | -3.843239E+00 |
| 65 | 1.219276E+00 | -1.509565E+00 | 1.229270E+00 | -6.481520E-01 |
| 66 | 2.910473E-02 | -3.141440E-02 | 1.661331E-02 | -5.274937E-03 |
| Surface | $a_{16}$ | $a_{18}$ | $a_{20}$ | |
| 15 | 1.140543E-02 | | | |
| 16 | -1.259042E+01 | | | |
| 25 | 4.780466E+00 | | | |
| 26 | 1.807680E+01 | | | |
| 35 | 2.043191E+00 | | | |
| 36 | 4.485904E+00 | | | |
| 45 | -2.971504E-01 | | | |
| 46 | -6.406688E-01 | 1.208256E-01 | | |
| 55 | 1.004163E+00 | -1.949979E-01 | | |
| 56 | 1.764195E+00 | -4.561673E-01 | 5.004574E-02 | |
| 65 | 2.084457E-01 | -3.641940E-02 | 2.760045E-03 | |
| 66 | 1.009708E-03 | -1.074462E-04 | 4.888012E-06 | |

FIG. 29

| Seventh embodiment |||||||
| :---: | :---: | :---: | :---: | :---: | :---: | :---: |
| EFL=2.105 mm ,HFOV=58.519° ,System length= 5.907 mm, Fno=2.250, Image height= 2.926 mm |||||||
| Element | Surface | Radius(mm) | Thickness (mm) | Refractive index | Abbe number | Focal length (mm) |
| Object | | Infinity | Infinity | | | |
| First lens element 1 | Object-side Surface 15 | -27.639 | 0.442 | 1.545 | 55.987 | -3.558 |
| | Image-side Surface 16 | 2.102 | 0.935 | | | |
| Aperture 0 | | Infinity | 0.048 | | | |
| Second lens element 2 | Object-side Surface 25 | 6.585 | 0.424 | 1.545 | 55.987 | 3.148 |
| | Image-side Surface 26 | -2.274 | 0.029 | | | |
| Third lens element 3 | Object-side Surface 35 | -24.978 | 0.373 | 1.545 | 55.987 | 3.957 |
| | Image-side Surface 36 | -2.000 | 0.059 | | | |
| Fourth lens element 4 | Object-side Surface 45 | 14.741 | 0.452 | 1.661 | 20.373 | -3.960 |
| | Image-side Surface 46 | 2.213 | 0.261 | | | |
| Fifth lens element 5 | Object-side Surface 55 | -3.210 | 0.468 | 1.545 | 55.987 | 2.032 |
| | Image-side Surface 56 | -0.867 | 0.033 | | | |
| Sixth lens element 6 | Object-side Surface 65 | 42.858 | 0.333 | 1.642 | 22.409 | -4.373 |
| | Image-side Surface 66 | 2.647 | 0.600 | | | |
| Filter 9 | Object-side Surface 95 | Infinity | 0.210 | 1.517 | 64.167 | |
| | Image-side Surface 96 | Infinity | 1.240 | | | |
| | Image plane 99 | Infinity | | | | |

FIG. 32

| Surface | K | $a_2$ | $a_4$ | $a_6$ |
|---|---|---|---|---|
| 15 | 0.000000E+00 | 0.000000E+00 | 4.086273E-01 | -4.304518E-01 |
| 16 | 4.780145E+00 | 0.000000E+00 | 6.084277E-01 | 1.241272E-01 |
| 25 | -2.780812E+01 | 0.000000E+00 | 2.770124E-02 | 1.302356E-01 |
| 26 | 0.000000E+00 | 0.000000E+00 | -1.870104E-02 | -1.226036E+00 |
| 35 | 0.000000E+00 | 0.000000E+00 | -3.064342E-02 | -1.749719E+00 |
| 36 | 0.000000E+00 | 0.000000E+00 | 1.139465E-01 | -2.595066E+00 |
| 45 | 0.000000E+00 | 0.000000E+00 | 7.388479E-02 | -1.839821E+00 |
| 46 | 0.000000E+00 | 0.000000E+00 | 9.104097E-02 | -6.683314E-01 |
| 55 | 0.000000E+00 | 0.000000E+00 | 2.020869E-01 | -2.142729E-01 |
| 56 | -2.296952E+00 | 0.000000E+00 | 3.154905E-01 | -1.133349E+00 |
| 65 | -8.579301E+01 | 0.000000E+00 | 1.144158E-01 | -6.506715E-01 |
| 66 | -4.253066E+01 | 0.000000E+00 | -7.900045E-02 | 3.833062E-03 |
| Surface | $a_8$ | $a_{10}$ | $a_{12}$ | $a_{14}$ |
| 15 | 4.637721E-01 | -3.750627E-01 | 2.119027E-01 | -7.409762E-02 |
| 16 | -2.261703E+00 | 8.814489E+00 | -1.859443E+01 | 2.503922E+01 |
| 25 | -1.151525E+00 | 2.741162E+00 | -5.222224E+00 | 5.667476E+00 |
| 26 | 6.321095E+00 | -2.211177E+01 | 4.239433E+01 | -4.282063E+01 |
| 35 | 6.147488E+00 | -1.634854E+01 | 2.293395E+01 | -1.438116E+01 |
| 36 | 8.712261E+00 | -1.743601E+01 | 2.100963E+01 | -1.443431E+01 |
| 45 | 5.529173E+00 | -7.804467E+00 | 5.344368E+00 | -1.153571E+00 |
| 46 | 1.126727E+00 | -6.135585E-01 | -6.644775E-01 | 1.205907E+00 |
| 55 | 7.330043E-01 | -1.816805E+00 | 2.544021E+00 | -2.119810E+00 |
| 56 | 2.937731E+00 | -4.755689E+00 | 5.266369E+00 | -3.859680E+00 |
| 65 | 1.236328E+00 | -1.507404E+00 | 1.229348E+00 | -6.481852E-01 |
| 66 | 2.797486E-02 | -3.065936E-02 | 1.670845E-02 | -5.293120E-03 |
| Surface | $a_{16}$ | $a_{18}$ | $a_{20}$ | |
| 15 | 1.106397E-02 | | | |
| 16 | -1.509880E+01 | | | |
| 25 | -6.972737E+00 | | | |
| 26 | 1.738325E+01 | | | |
| 35 | 3.889214E+00 | | | |
| 36 | 4.504783E+00 | | | |
| 45 | -3.908644E-01 | | | |
| 46 | -6.663551E-01 | 1.041468E-01 | | |
| 55 | 1.029399E+00 | -2.421319E-01 | | |
| 56 | 1.750920E+00 | -4.590031E-01 | 6.099113E-02 | |
| 65 | 2.083414E-01 | -3.657700E-02 | 2.634557E-03 | |
| 66 | 9.934081E-04 | -1.130209E-04 | 4.286796E-06 | |

FIG. 33

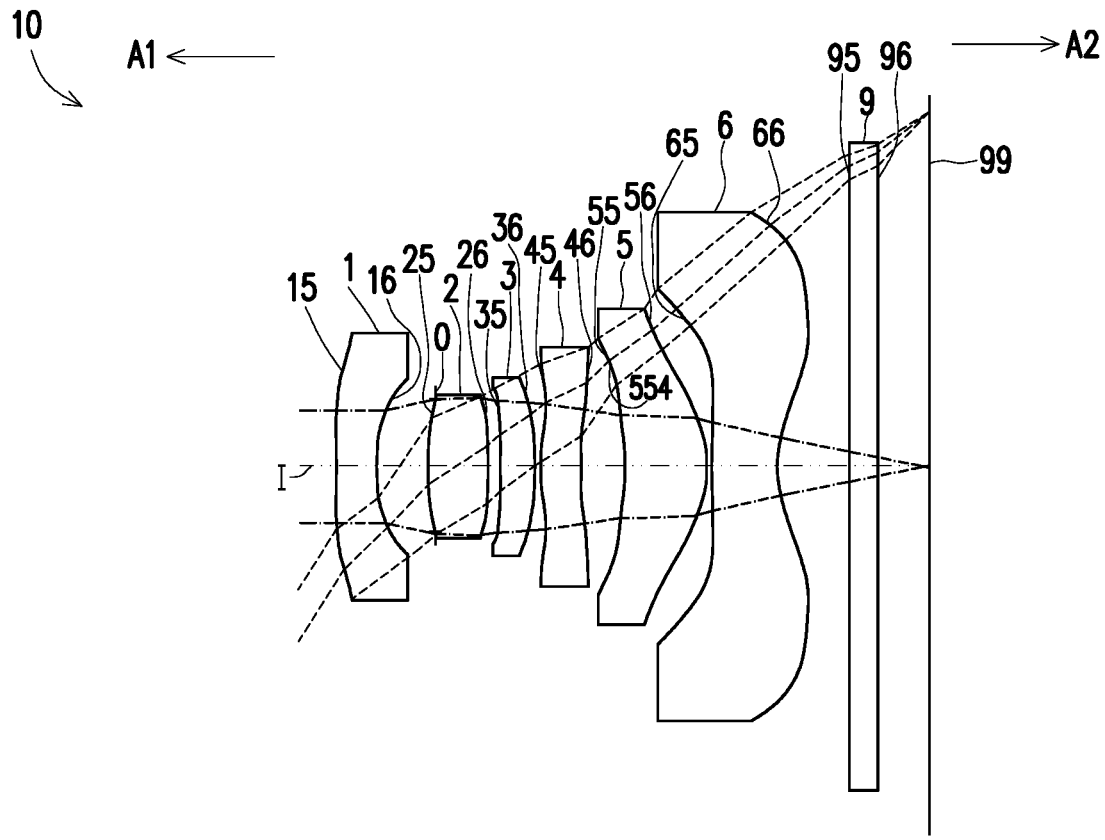
FIG. 34
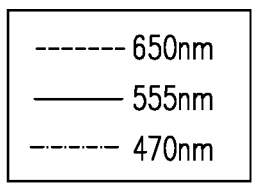
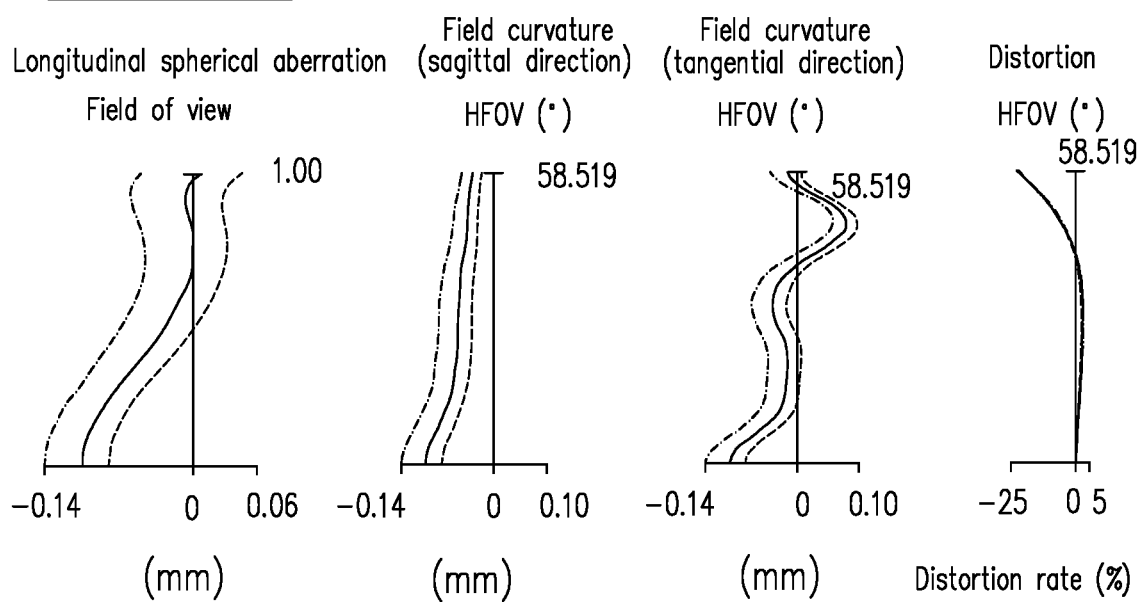
FIG. 35A    FIG. 35B    FIG. 35C   FIG. 35D

| Eighth embodiment | | | | | | |
|---|---|---|---|---|---|---|
| EFL=2.208 mm ,HFOV=58.519° ,System length= 4.900 mm, Fno=2.250, Image height= 2.900 mm | | | | | | |
| Element | Surface | Radius(mm) | Thickness (mm) | Refractive index | Abbe number | Focal length (mm) |
| Object | | Infinity | Infinity | | | |
| First lens element 1 | Object-side Surface 15 | -11.032 | 0.338 | 1.545 | 55.987 | -4.173 |
| | Image-side Surface 16 | 2.905 | 0.487 | | | |
| Aperture 0 | | Infinity | -0.057 | | | |
| Second lens element 2 | Object-side Surface 25 | 2.450 | 0.492 | 1.545 | 55.987 | 2.827 |
| | Image-side Surface 26 | -3.880 | 0.092 | | | |
| Third lens element 3 | Object-side Surface 35 | -17.813 | 0.289 | 1.545 | 55.987 | 5.875 |
| | Image-side Surface 36 | -2.735 | 0.061 | | | |
| Fourth lens element 4 | Object-side Surface 45 | 4.675 | 0.320 | 1.545 | 55.987 | -90.612 |
| | Image-side Surface 46 | 4.168 | 0.368 | | | |
| Fifth lens element 5 | Object-side Surface 55 | -2.217 | 0.674 | 1.642 | 22.409 | 1.809 |
| | Image-side Surface 56 | -0.858 | 0.027 | | | |
| Sixth lens element 6 | Object-side Surface 65 | 3.748 | 0.548 | 1.642 | 22.409 | -1.836 |
| | Image-side Surface 66 | 0.850 | 0.600 | | | |
| Filter 9 | Object-side Surface 95 | Infinity | 0.210 | 1.517 | 64.167 | |
| | Image-side Surface 96 | Infinity | 0.451 | | | |
| | Image plane 99 | Infinity | | | | |

FIG. 36

| Surface | K | $a_2$ | $a_4$ | $a_6$ |
|---|---|---|---|---|
| 15 | 0.000000E+00 | 0.000000E+00 | 3.712705E-01 | -4.351436E-01 |
| 16 | 1.163167E+01 | 0.000000E+00 | 5.929851E-01 | -2.875979E-01 |
| 25 | -3.198916E-01 | 0.000000E+00 | 4.973916E-02 | 8.392285E-02 |
| 26 | 0.000000E+00 | 0.000000E+00 | -3.819646E-02 | -1.347347E+00 |
| 35 | 0.000000E+00 | 0.000000E+00 | 5.820282E-02 | -1.667247E+00 |
| 36 | 0.000000E+00 | 0.000000E+00 | 2.114797E-01 | -2.501796E+00 |
| 45 | 0.000000E+00 | 0.000000E+00 | 1.160554E-01 | -1.929376E+00 |
| 46 | 0.000000E+00 | 0.000000E+00 | 9.284117E-02 | -7.305448E-01 |
| 55 | 0.000000E+00 | 0.000000E+00 | 2.121791E-01 | -3.987029E-01 |
| 56 | -2.534924E+00 | 0.000000E+00 | 2.872849E-01 | -1.180824E+00 |
| 65 | -8.579301E+01 | 0.000000E+00 | 2.779821E-02 | -6.325139E-01 |
| 66 | -5.917099E+00 | 0.000000E+00 | -1.016142E-01 | 1.282069E-02 |
| Surface | $a_8$ | $a_{10}$ | $a_{12}$ | $a_{14}$ |
| 15 | 4.604405E-01 | -3.857601E-01 | 2.064613E-01 | -7.403197E-02 |
| 16 | -1.296477E+00 | 8.532931E+00 | -2.039397E+01 | 2.333192E+01 |
| 25 | -1.297616E+00 | 3.447664E+00 | -5.061961E+00 | 4.174912E-01 |
| 26 | 6.047173E+00 | -2.163667E+01 | 4.320297E+01 | -4.273590E+01 |
| 35 | 5.955664E+00 | -1.613423E+01 | 2.412161E+01 | -1.381437E+01 |
| 36 | 8.631779E+00 | -1.753102E+01 | 2.130846E+01 | -1.432585E+01 |
| 45 | 5.541515E+00 | -7.804944E+00 | 5.333530E+00 | -1.162061E+00 |
| 46 | 1.232346E+00 | -6.171311E-01 | -7.187849E-01 | 1.196997E+00 |
| 55 | 8.393560E-01 | -1.772131E+00 | 2.530076E+00 | -2.175690E+00 |
| 56 | 2.918289E+00 | -4.763554E+00 | 5.267520E+00 | -3.847497E+00 |
| 65 | 1.218311E+00 | -1.506905E+00 | 1.230801E+00 | -6.477098E-01 |
| 66 | 2.844621E-02 | -3.130668E-02 | 1.663480E-02 | -5.275841E-03 |
| Surface | $a_{16}$ | $a_{18}$ | $a_{20}$ | |
| 15 | 1.413173E-02 | | | |
| 16 | -1.256108E+01 | | | |
| 25 | -1.501582E+00 | | | |
| 26 | 1.478872E+01 | | | |
| 35 | 1.289755E+00 | | | |
| 36 | 4.735166E+00 | | | |
| 45 | -3.786490E-01 | | | |
| 46 | -6.321232E-01 | 1.195426E-01 | | |
| 55 | 1.007292E+00 | -1.917815E-01 | | |
| 56 | 1.762618E+00 | -4.561650E-01 | 5.064318E-02 | |
| 65 | 2.084014E-01 | -3.658415E-02 | 2.623822E-03 | |
| 66 | 1.008824E-03 | -1.075957E-04 | 4.908721E-06 | |

FIG. 37

| Ninth embodiment ||||||
|---|---|---|---|---|---|
| EFL=2.151 mm ,HFOV=58.519° ,System length= 4.897 mm, Fno=2.250, Image height= 2.889 mm ||||||
| Element | Surface | Radius(mm) | Thickness (mm) | Refractive index | Abbe number | Focal length (mm) |
| Object | | Infinity | Infinity | | | |
| First lens element 1 | Object-side Surface 15 | -15.774 | 0.348 | 1.545 | 55.987 | -4.496 |
| | Image-side Surface 16 | 2.932 | 0.593 | | | |
| Aperture 0 | | Infinity | -0.055 | | | |
| Second lens element 2 | Object-side Surface 25 | 2.421 | 0.529 | 1.545 | 55.987 | 2.661 |
| | Image-side Surface 26 | -3.358 | 0.119 | | | |
| Third lens element 3 | Object-side Surface 35 | -308.112 | 0.354 | 1.545 | 55.987 | 3.387 |
| | Image-side Surface 36 | -1.840 | 0.050 | | | |
| Fourth lens element 4 | Object-side Surface 45 | 19.151 | 0.330 | 1.661 | 20.373 | -4.906 |
| | Image-side Surface 46 | 2.776 | 0.318 | | | |
| Fifth lens element 5 | Object-side Surface 55 | -2.091 | 0.539 | 1.642 | 22.409 | 1.898 |
| | Image-side Surface 56 | -0.852 | 0.051 | | | |
| Sixth lens element 6 | Object-side Surface 65 | 5.428 | 0.549 | 1.545 | 55.987 | -2.063 |
| | Image-side Surface 66 | 0.900 | 0.600 | | | |
| Filter 9 | Object-side Surface 95 | Infinity | 0.210 | 1.517 | 64.167 | |
| | Image-side Surface 96 | Infinity | 0.362 | | | |
| | Image plane 99 | Infinity | | | | |

FIG. 40

| Surface | K | $a_2$ | $a_4$ | $a_6$ |
|---|---|---|---|---|
| 15 | 0.000000E+00 | 0.000000E+00 | 3.876680E-01 | -4.290438E-01 |
| 16 | 1.163167E+01 | 0.000000E+00 | 6.078855E-01 | -2.909132E-01 |
| 25 | -3.198916E-01 | 0.000000E+00 | 1.400726E-02 | 1.097292E-01 |
| 26 | 0.000000E+00 | 0.000000E+00 | -1.469520E-02 | -1.333976E+00 |
| 35 | 0.000000E+00 | 0.000000E+00 | 4.793872E-02 | -1.638840E+00 |
| 36 | 0.000000E+00 | 0.000000E+00 | 1.615596E-01 | -2.500398E+00 |
| 45 | 0.000000E+00 | 0.000000E+00 | 6.868301E-02 | -1.972699E+00 |
| 46 | 0.000000E+00 | 0.000000E+00 | 1.040048E-01 | -7.287059E-01 |
| 55 | 0.000000E+00 | 0.000000E+00 | 2.425921E-01 | -3.791124E-01 |
| 56 | -2.534924E+00 | 0.000000E+00 | 2.854001E-01 | -1.176106E+00 |
| 65 | -8.579301E+01 | 0.000000E+00 | 5.189107E-02 | -6.292906E-01 |
| 66 | -5.917099E+00 | 0.000000E+00 | -8.600968E-02 | 1.001985E-02 |
| Surface | $a_8$ | $a_{10}$ | $a_{12}$ | $a_{14}$ |
| 15 | 4.621796E-01 | -3.856594E-01 | 2.060397E-01 | -7.448929E-02 |
| 16 | -1.286199E+00 | 8.538917E+00 | -2.042103E+01 | 2.333463E+01 |
| 25 | -1.326482E+00 | 3.263366E+00 | -5.362046E+00 | -1.284749E+00 |
| 26 | 6.077212E+00 | -2.160642E+01 | 4.315247E+01 | -4.306829E+01 |
| 35 | 5.984645E+00 | -1.611772E+01 | 2.410334E+01 | -1.389357E+01 |
| 36 | 8.634537E+00 | -1.753451E+01 | 2.131539E+01 | -1.421369E+01 |
| 45 | 5.525080E+00 | -7.793926E+00 | 5.352307E+00 | -1.176848E+00 |
| 46 | 1.228744E+00 | -6.203754E-01 | -7.206976E-01 | 1.195984E+00 |
| 55 | 8.556739E-01 | -1.762227E+00 | 2.534246E+00 | -2.175311E+00 |
| 56 | 2.919439E+00 | -4.763265E+00 | 5.267689E+00 | -3.847366E+00 |
| 65 | 1.217796E+00 | -1.507556E+00 | 1.230515E+00 | -6.477914E-01 |
| 66 | 2.842991E-02 | -3.129626E-02 | 1.663017E-02 | -5.277185E-03 |
| Surface | $a_{16}$ | $a_{18}$ | $a_{20}$ | |
| 15 | 1.377997E-02 | | | |
| 16 | -1.252730E+01 | | | |
| 25 | 1.099242E+00 | | | |
| 26 | 1.366654E+01 | | | |
| 35 | 9.397337E-01 | | | |
| 36 | 5.063632E+00 | | | |
| 45 | -4.910631E-01 | | | |
| 46 | -6.332315E-01 | 1.172271E-01 | | |
| 55 | 1.005606E+00 | -1.943389E-01 | | |
| 56 | 1.762705E+00 | -4.561193E-01 | 5.065928E-02 | |
| 65 | 2.083944E-01 | -3.657215E-02 | 2.636638E-03 | |
| 66 | 1.008718E-03 | -1.075626E-04 | 4.928964E-06 | |

FIG. 41

| Tenth embodiment ||||||
|---|---|---|---|---|---|
| EFL=2.146 mm ,HFOV=58.519° ,System length= 4.846 mm, Fno=2.250, Image height= 2.859 mm ||||||
| Element | Surface | Radius(mm) | Thickness (mm) | Refractive index | Abbe number | Focal length (mm) |
| Object | | Infinity | Infinity | | | |
| First lens element 1 | Object-side Surface 15 | -20.434 | 0.352 | 1.545 | 55.987 | -4.684 |
| | Image-side Surface 16 | 2.943 | 0.532 | | | |
| Aperture 0 | | Infinity | -0.049 | | | |
| Second lens element 2 | Object-side Surface 25 | 2.566 | 0.574 | 1.545 | 55.987 | 2.520 |
| | Image-side Surface 26 | -2.735 | 0.116 | | | |
| Third lens element 3 | Object-side Surface 35 | -32.702 | 0.370 | 1.545 | 55.987 | 3.122 |
| | Image-side Surface 36 | -1.628 | 0.029 | | | |
| Fourth lens element 4 | Object-side Surface 45 | 10.883 | 0.296 | 1.642 | 22.409 | -4.667 |
| | Image-side Surface 46 | 2.339 | 0.430 | | | |
| Fifth lens element 5 | Object-side Surface 55 | -2.102 | 0.624 | 1.642 | 22.409 | 1.989 |
| | Image-side Surface 56 | -0.892 | 0.029 | | | |
| Sixth lens element 6 | Object-side Surface 65 | 3.103 | 0.489 | 1.642 | 22.409 | -2.056 |
| | Image-side Surface 66 | 0.874 | 0.600 | | | |
| Filter 9 | Object-side Surface 95 | Infinity | 0.210 | 1.517 | 64.167 | |
| | Image-side Surface 96 | Infinity | 0.242 | | | |
| | Image plane 99 | Infinity | | | | |

FIG. 44

| Surface | K | $a_2$ | $a_4$ | $a_6$ |
|---|---|---|---|---|
| 15 | 0.000000E+00 | 0.000000E+00 | 3.681813E-01 | -4.363213E-01 |
| 16 | 1.163167E+01 | 0.000000E+00 | 5.919880E-01 | -3.296757E-01 |
| 25 | -3.198916E-01 | 0.000000E+00 | 4.071035E-02 | 8.081321E-02 |
| 26 | 0.000000E+00 | 0.000000E+00 | -8.675858E-03 | -1.307274E+00 |
| 35 | 0.000000E+00 | 0.000000E+00 | 5.023401E-02 | -1.676989E+00 |
| 36 | 0.000000E+00 | 0.000000E+00 | 1.909282E-01 | -2.509736E+00 |
| 45 | 0.000000E+00 | 0.000000E+00 | 7.520543E-02 | -1.954467E+00 |
| 46 | 0.000000E+00 | 0.000000E+00 | 8.669531E-02 | -7.337042E-01 |
| 55 | 0.000000E+00 | 0.000000E+00 | 2.219010E-01 | -3.897975E-01 |
| 56 | -2.534924E+00 | 0.000000E+00 | 2.757484E-01 | -1.190280E+00 |
| 65 | -8.579301E+01 | 0.000000E+00 | 2.978070E-02 | -6.306049E-01 |
| 66 | -5.917099E+00 | 0.000000E+00 | -9.044445E-02 | 1.150830E-02 |
| Surface | $a_8$ | $a_{10}$ | $a_{12}$ | $a_{14}$ |
| 15 | 4.595882E-01 | -3.858624E-01 | 2.066389E-01 | -7.391909E-02 |
| 16 | -1.321928E+00 | 8.517630E+00 | -2.043209E+01 | 2.333909E+01 |
| 25 | -1.307631E+00 | 3.404400E+00 | -5.249753E+00 | -3.356925E-01 |
| 26 | 6.099426E+00 | -2.163274E+01 | 4.307951E+01 | -4.310919E+01 |
| 35 | 5.947410E+00 | -1.614466E+01 | 2.403713E+01 | -1.398883E+01 |
| 36 | 8.623628E+00 | -1.753735E+01 | 2.131836E+01 | -1.426103E+01 |
| 45 | 5.536295E+00 | -7.799274E+00 | 5.342909E+00 | -1.154821E+00 |
| 46 | 1.230467E+00 | -6.195321E-01 | -7.217172E-01 | 1.194386E+00 |
| 55 | 8.420672E-01 | -1.771139E+00 | 2.531022E+00 | -2.174691E+00 |
| 56 | 2.914523E+00 | -4.764689E+00 | 5.267271E+00 | -3.847483E+00 |
| 65 | 1.219262E+00 | -1.506703E+00 | 1.230807E+00 | -6.477346E-01 |
| 66 | 2.817907E-02 | -3.133298E-02 | 1.663375E-02 | -5.275255E-03 |
| Surface | $a_{16}$ | $a_{18}$ | $a_{20}$ | |
| 15 | 1.410440E-02 | | | |
| 16 | -1.241989E+01 | | | |
| 25 | -4.788289E+00 | | | |
| 26 | 1.373322E+01 | | | |
| 35 | 9.158254E-01 | | | |
| 36 | 4.896764E+00 | | | |
| 45 | -3.976454E-01 | | | |
| 46 | -6.333728E-01 | 1.206091E-01 | | |
| 55 | 1.008115E+00 | -1.913009E-01 | | |
| 56 | 1.762689E+00 | -4.560985E-01 | 5.069152E-02 | |
| 65 | 2.083812E-01 | -3.659615E-02 | 2.617541E-03 | |
| 66 | 1.009047E-03 | -1.075409E-04 | 4.920816E-06 | |

FIG. 45

| Condition expression | First | Second | Third | Fourth | Fifth |
|---|---|---|---|---|---|
| EFL | 2.060 | 2.147 | 2.022 | 1.939 | 2.046 |
| T1 | 0.369 | 0.444 | 0.360 | 0.450 | 0.288 |
| G12 | 0.533 | 0.313 | 0.607 | 0.793 | 0.497 |
| T2 | 0.530 | 0.652 | 0.396 | 0.712 | 0.441 |
| G23 | 0.036 | 0.053 | 0.074 | 0.032 | 0.033 |
| T3 | 0.270 | 0.362 | 0.354 | 0.318 | 0.408 |
| G34 | 0.169 | 0.101 | 0.085 | 0.039 | 0.038 |
| T4 | 0.288 | 0.315 | 0.313 | 0.228 | 0.266 |
| G45 | 0.144 | 0.262 | 0.304 | 0.486 | 0.285 |
| T5 | 0.968 | 0.866 | 1.057 | 0.680 | 1.007 |
| G56 | 0.049 | 0.033 | 0.041 | 0.038 | 0.038 |
| T6 | 0.491 | 0.373 | 0.330 | 0.354 | 0.551 |
| G6F | 0.600 | 0.600 | 0.600 | 0.600 | 0.400 |
| TF | 0.210 | 0.210 | 0.210 | 0.210 | 0.210 |
| GFP | 0.406 | 0.736 | 0.494 | 0.308 | 0.179 |
| BFL | 1.216 | 1.546 | 1.304 | 1.118 | 0.789 |
| ALT | 2.918 | 3.012 | 2.811 | 2.741 | 2.962 |
| AAG | 0.931 | 0.762 | 1.112 | 1.389 | 0.891 |
| TL | 3.849 | 3.774 | 3.922 | 4.129 | 3.853 |
| TTL | 5.065 | 5.319 | 5.226 | 5.247 | 4.643 |
| V4+V5+V6 | 98.769 | 98.769 | 98.769 | 98.769 | 98.769 |
| (T1+T2+G34+G45)/(G23+T5) | 1.207 | 1.588 | 1.013 | 2.369 | 1.012 |
| (T2+T3+G34+G45)/(G23+T4) | 3.430 | 3.742 | 2.943 | 5.980 | 3.929 |
| EFL/BFL | 1.694 | 1.389 | 1.551 | 1.735 | 2.593 |
| EFL/(T2+T6) | 2.016 | 2.095 | 2.786 | 1.820 | 2.061 |
| EFL/T5 | 2.127 | 2.480 | 1.912 | 2.854 | 2.031 |
| AAG/T1 | 2.523 | 1.714 | 3.090 | 3.090 | 3.091 |
| ALT/(G12+G23+G45) | 4.087 | 4.798 | 2.851 | 2.089 | 3.633 |
| TTL/(G12+T5) | 3.373 | 4.512 | 3.139 | 3.564 | 3.085 |
| (T1+T3+G23)/T2 | 1.274 | 1.319 | 1.990 | 1.124 | 1.653 |
| (T1+T4+G34)/T3 | 3.057 | 2.376 | 2.140 | 2.249 | 1.452 |
| (T1+T3+G56)/T6 | 1.401 | 2.248 | 2.290 | 2.280 | 1.332 |
| BFL/G12 | 2.280 | 4.936 | 2.146 | 1.410 | 1.587 |
| TL/(G12+T5) | 2.564 | 3.201 | 2.356 | 2.805 | 2.561 |
| TTL/(T2+T5+T6) | 2.545 | 2.814 | 2.931 | 3.007 | 2.321 |
| (T1+G34+G56)/(G23+G45) | 3.246 | 1.839 | 1.284 | 1.015 | 1.147 |
| (T3+G34+G56)/(G23+G45) | 2.699 | 1.578 | 1.270 | 0.762 | 1.522 |
| (T4+G34+G56)/(G23+G45) | 2.799 | 1.427 | 1.161 | 0.588 | 1.075 |

FIG. 46

| Condition expression | Sixth | Seventh | Eighth | Ninth | Tenth |
|---|---|---|---|---|---|
| EFL | 2.237 | 2.105 | 2.208 | 2.151 | 2.146 |
| T1 | 0.456 | 0.442 | 0.338 | 0.348 | 0.352 |
| G12 | 0.517 | 0.983 | 0.430 | 0.538 | 0.483 |
| T2 | 0.516 | 0.424 | 0.492 | 0.529 | 0.574 |
| G23 | 0.065 | 0.029 | 0.092 | 0.119 | 0.116 |
| T3 | 0.510 | 0.373 | 0.289 | 0.354 | 0.370 |
| G34 | 0.010 | 0.059 | 0.061 | 0.050 | 0.029 |
| T4 | 0.269 | 0.452 | 0.320 | 0.330 | 0.296 |
| G45 | 0.365 | 0.261 | 0.368 | 0.318 | 0.430 |
| T5 | 0.499 | 0.468 | 0.674 | 0.539 | 0.624 |
| G56 | 0.213 | 0.033 | 0.027 | 0.051 | 0.029 |
| T6 | 1.048 | 0.333 | 0.548 | 0.549 | 0.489 |
| G6F | 0.600 | 0.600 | 0.600 | 0.600 | 0.600 |
| TF | 0.210 | 0.210 | 0.210 | 0.210 | 0.210 |
| GFP | 0.401 | 1.240 | 0.451 | 0.362 | 0.242 |
| BFL | 1.211 | 2.050 | 1.261 | 1.172 | 1.052 |
| ALT | 3.297 | 2.492 | 2.661 | 2.649 | 2.705 |
| AAG | 1.170 | 1.365 | 0.978 | 1.076 | 1.088 |
| TL | 4.467 | 3.857 | 3.639 | 3.726 | 3.793 |
| TTL | 5.677 | 5.907 | 4.900 | 4.897 | 4.846 |
| V4+V5+V6 | 98.769 | 98.769 | 100.805 | 98.769 | 67.227 |
| (T1+T2+G34+G45)/(G23+T5) | 2.391 | 2.382 | 1.645 | 1.892 | 1.871 |
| (T2+T3+G34+G45)/(G23+T4) | 4.203 | 2.320 | 2.938 | 2.790 | 3.401 |
| EFL/BFL | 1.848 | 1.027 | 1.751 | 1.836 | 2.039 |
| EFL/(T2+T6) | 1.430 | 2.780 | 2.123 | 1.996 | 2.019 |
| EFL/T5 | 4.486 | 4.493 | 3.278 | 3.989 | 3.438 |
| AAG/T1 | 2.567 | 3.092 | 2.893 | 3.092 | 3.090 |
| ALT/(G12+G23+G45) | 3.483 | 1.958 | 2.988 | 2.715 | 2.626 |
| TTL/(G12+T5) | 5.592 | 4.070 | 4.439 | 4.544 | 4.375 |
| (T1+T3+G23)/T2 | 1.995 | 1.992 | 1.461 | 1.552 | 1.461 |
| (T1+T4+G34)/T3 | 1.441 | 2.556 | 2.487 | 2.055 | 1.832 |
| (T1+T3+G56)/T6 | 1.124 | 2.542 | 1.195 | 1.373 | 1.537 |
| BFL/G12 | 2.344 | 2.085 | 2.931 | 2.176 | 2.177 |
| TL/(G12+T5) | 4.399 | 2.658 | 3.297 | 3.457 | 3.425 |
| TTL/(T2+T5+T6) | 2.752 | 4.821 | 2.859 | 3.029 | 2.873 |
| (T1+G34+G56)/(G23+G45) | 1.578 | 1.841 | 0.926 | 1.028 | 0.751 |
| (T3+G34+G56)/(G23+G45) | 1.703 | 1.604 | 0.819 | 1.041 | 0.783 |
| (T4+G34+G56)/(G23+G45) | 1.143 | 1.878 | 0.886 | 0.985 | 0.648 |

FIG. 47

OPTICAL IMAGING LENS

CROSS REFERENCE TO RELATED APPLICATION

This application claims the priority benefit of China application serial no. 201810295011.5, filed on Mar. 30, 2018. The entirety of the above-mentioned patent application is hereby incorporated by reference herein and made a part of specification.

BACKGROUND OF THE DISCLOSURE

1. Field of the Invention

The invention relates to an optical element, and more particularly, to an optical imaging lens.

2. Description of Related Art

Specifications of portable electronic products are ever-changing, an optical imaging lens, as a critical part, has also been developed to be more diversified. In addition to slimness and favorable imaging quality, the pursuit of smaller focal length and larger field of view can further facilitate element design for multi-lens zoom. The existing large-angle optical imaging lenses are not only long and thick, but also failed to meet market demands because of poor image quality such as distortion.

However, in optical imaging lens design, downsizing a lens with good imaging quality will not necessary guarantee that the optical imaging lens can be manufactured with both imaging quality and miniaturization taken into consideration. Instead, the design process involves material characteristics as well as practical problems in production (the manufacturing process, assembling yield rate, etc.). Therefore, how to fabricate an optical imaging lens with large field of view and favorable image quality in consideration of all the factors above has been a subject of constant discussion in the industry.

SUMMARY OF THE INVENTION

The invention is directed to an optical imaging lens, which has large field of view and favorable imaging quality.

An embodiment of the invention proposes an optical imaging lens, which includes a first lens element, a second lens element, a third lens element, a fourth lens element, a fifth lens element, and a sixth lens element arranged in sequence from an object side to an image side along an optical axis. Each of the first lens element to the sixth lens element includes an object-side surface facing the object side and allowing imaging rays to pass through and an image-side surface facing the image side and allowing the imaging rays to pass through. The first lens element has negative refracting power, and a periphery region of the object-side surface of the first lens element is convex. An optical axis region of the image-side surface of the second lens element is convex. An optical axis region of the object-side surface of the third lens element is concave. An optical axis region of the object-side surface of the fourth lens element is convex, and a periphery region of the image-side surface of the fourth lens element is concave. The optical imaging lens only includes abovementioned six lens elements having refracting power, and the optical imaging lens satisfies the following condition expression: $V4+V5+V6 \leq 120.000$. V4 is an Abbe number of the fourth lens element, V5 is an Abbe number of the fifth lens element, and V6 is an Abbe number of the sixth lens element.

An embodiment of the invention proposes an optical imaging lens, which includes a first lens element, a second lens element, a third lens element, a fourth lens element, a fifth lens element, and a sixth lens element arranged in sequence from an object side to an image side along an optical axis. Each of the first lens element to the sixth lens element includes an object-side surface facing the object side and allowing imaging rays to pass through and an image-side surface facing the image side and allowing the imaging rays to pass through. The first lens element has negative refracting power. An optical axis region of the image-side surface of the second lens element is convex. An optical axis region of the object-side surface of the third lens element is concave. A periphery region of the image-side surface of the fourth lens element is concave. The optical imaging lens only includes abovementioned six lens elements having refracting power, and the optical imaging lens satisfies condition expressions: $V4+V5+V6 \leq 120.000$ and $(T1+T2+G34+G45)/(G23+T5) \leq 2.400$. V4 is an Abbe number of the fourth lens element, V5 is an Abbe number of the fifth lens element, V6 is an Abbe number of the sixth lens element, T1 is a thickness of the first lens element along the optical axis, T2 is a thickness of the second lens element along the optical axis, G34 is an air gap between the third lens element and the fourth lens element along the optical axis, G45 is an air gap between the fourth lens element and the fifth lens element along the optical axis, G23 is an air gap between the second lens element and the third lens element along the optical axis, and T5 is a thickness of the fifth lens element along the optical axis.

An embodiment of the invention proposes an optical imaging lens, which includes a first lens element, a second lens element, a third lens element, a fourth lens element, a fifth lens element, and a sixth lens element arranged in sequence from an object side to an image side along an optical axis. Each of the first lens element to the sixth lens element includes an object-side surface facing the object side and allowing imaging rays to pass through and an image-side surface facing the image side and allowing the imaging rays to pass through. The first lens element has negative refracting power. An optical axis region of the image-side surface of the second lens element is convex. An optical axis region of the object-side surface of the third lens element is concave. A periphery region of the image-side surface of the fourth lens element is concave. The optical imaging lens only includes abovementioned six lens elements having refracting power, and the optical imaging lens satisfies the following condition expressions: $V4+V5+V6 \leq 120.000$ and $(T2+T3+G34+G45)/(G23+T4) \leq 6.000$. V4 is an Abbe number of the fourth lens element, V5 is an Abbe number of the fifth lens element, V6 is an Abbe number of the sixth lens element, T2 is a thickness of the second lens element along the optical axis, T3 is a thickness of the third lens element along the optical axis, G34 is an air gap between the third lens element and the fourth lens element along the optical axis, G45 is an air gap between the fourth lens element and the fifth lens element along the optical axis, G23 is an air gap between the second lens element and the third lens element along the optical axis, and T4 is a thickness of the fourth lens element along the optical axis.

Based on the above, in the embodiments of the invention, the optical imaging lens can provide the following advantageous effects. In the optical imaging lens of the embodiments of the invention, with the number of the lenses having refracting power, the first lens element having negative refracting power, lenses shape design described above and aforesaid condition expressions all being satisfied, the optical imaging lens may have large field of view and favorable imaging quality.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 8 shows detailed optical data of the optical imaging lens according to the first embodiment of the invention.

FIG. 9 shows aspheric parameters of the optical imaging lens according to the first embodiment of the invention.

FIG. 12 shows detailed optical data of the optical imaging lens according to the second embodiment of the invention.

FIG. 13 shows aspheric parameters of the optical imaging lens according to the second embodiment of the invention.

FIG. 16 shows detailed optical data of the optical imaging lens according to the third embodiment of the invention.

FIG. 17 shows aspheric parameters of the optical imaging lens according to the third embodiment of the invention.

FIG. 20 shows detailed optical data of the optical imaging lens according to the fourth embodiment of the invention.

FIG. 21 shows aspheric parameters of the optical imaging lens according to the fourth embodiment of the invention.

FIG. 22 is a schematic view illustrating an optical imaging lens according to a fifth embodiment of the invention.

FIG. 23A to FIG. 23D are diagrams illustrating longitudinal spherical aberration and other aberrations of the optical imaging lens according to the fifth embodiment.

FIG. 24 shows detailed optical data of the optical imaging lens according to the fifth embodiment of the invention.

FIG. 25 shows aspheric parameters of the optical imaging lens according to the fifth embodiment of the invention.

FIG. 28 shows detailed optical data of the optical imaging lens according to the sixth embodiment of the invention.

FIG. 29 shows aspheric parameters of the optical imaging lens according to the sixth embodiment of the invention.

FIG. 32 shows detailed optical data of the optical imaging lens according to the seventh embodiment of the invention.

FIG. 33 shows aspheric parameters of the optical imaging lens according to the seventh embodiment of the invention.

FIG. 34 is a schematic view illustrating an optical imaging lens according to an eighth embodiment of the invention.

FIG. 35A to FIG. 35D are diagrams illustrating longitudinal spherical aberration and other aberrations of the optical imaging lens according to the eighth embodiment.

FIG. 36 shows detailed optical data of the optical imaging lens according to the eighth embodiment of the invention.

FIG. 37 shows aspheric parameters of the optical imaging lens according to the eighth embodiment of the invention.

FIG. 40 shows detailed optical data of the optical imaging lens according to the ninth embodiment of the invention.

FIG. 41 shows aspheric parameters of the optical imaging lens according to the ninth embodiment of the invention.

FIG. 44 shows detailed optical data of the optical imaging lens according to the tenth embodiment of the invention.

FIG. 45 shows aspheric parameters of the optical imaging lens according to the tenth embodiment of the invention.

FIG. 46 shows important parameters and values in related relational expressions of the optical imaging lens according to the first to the fifth embodiments of the invention.

FIG. 47 shows important parameters and values in related relational expressions of the optical imaging lens according to the sixth to the tenth embodiments of the invention.

DESCRIPTION OF THE EMBODIMENTS

Figure 1:
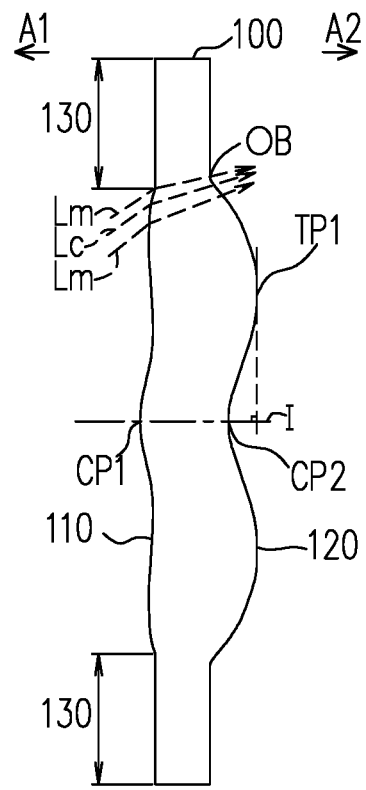
FIG. 1 is a schematic view illustrating a surface structure of a lens element.

Reference will now be made in detail to the present preferred embodiments of the invention, examples of which are illustrated in the accompanying drawings. Wherever possible, the same reference numbers are used in the drawings and the description to refer to the same or like parts.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object side (or image side) surface of a lens element" refers to a specific region of that surface of the lens element at which imaging rays can pass through that specific region. Imaging rays include at least two types of rays: a chief ray Lc and a marginal ray Lm (as shown in FIG. 1). An object side (or image side) surface of a lens element can be characterized as having several regions, including an optical axis region, a periphery region, and, in some cases, one or more intermediate regions, as discussed more fully below.

Figure 4:
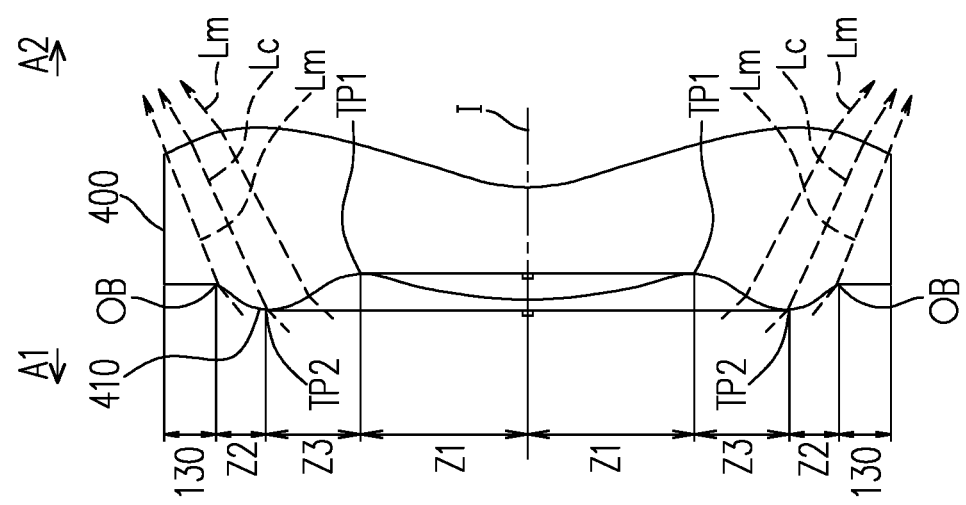
FIG. 4 is a schematic view illustrating a surface structure of a lens element according to a second example.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
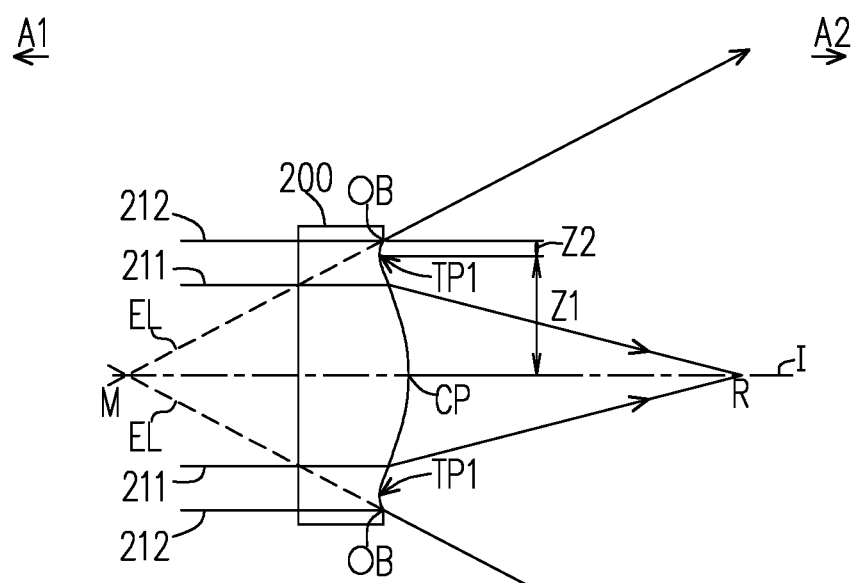
FIG. 2 is a schematic view illustrating a concave and convex surface structure of a lens element and a ray focal point.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
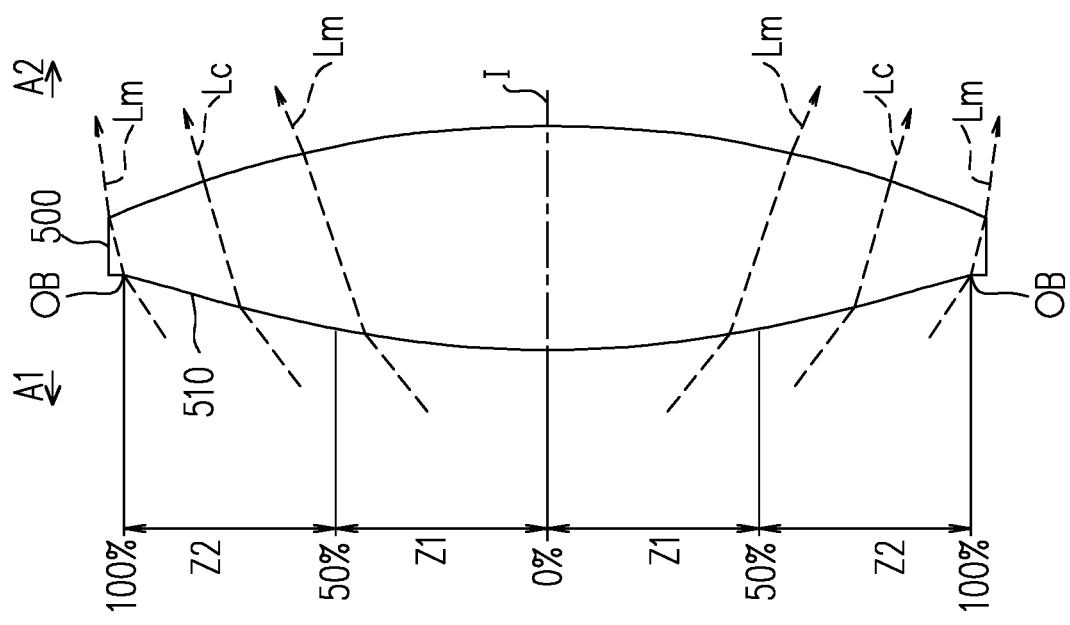
FIG. 5 is a schematic view illustrating a surface structure of a lens element according to a third example.
Figure 3:
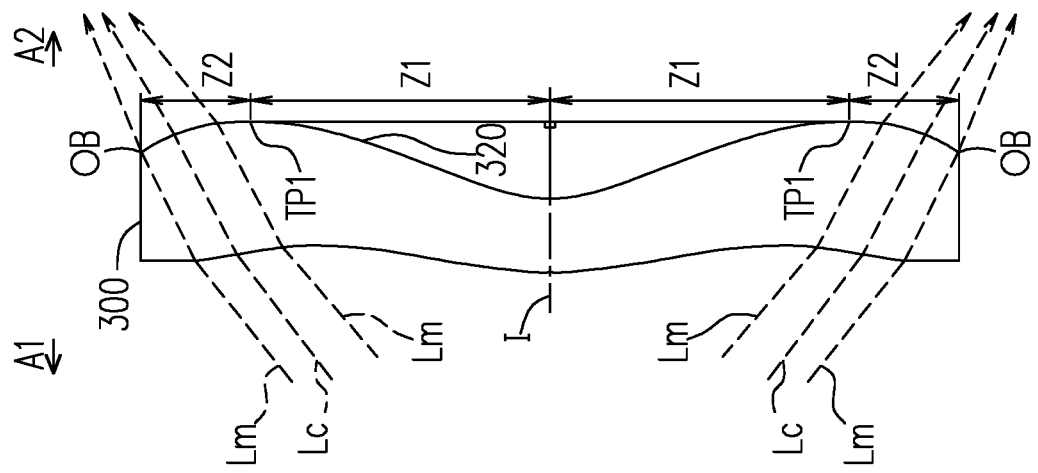
FIG. 3 is a schematic view illustrating a surface structure of a lens element according to a first example.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
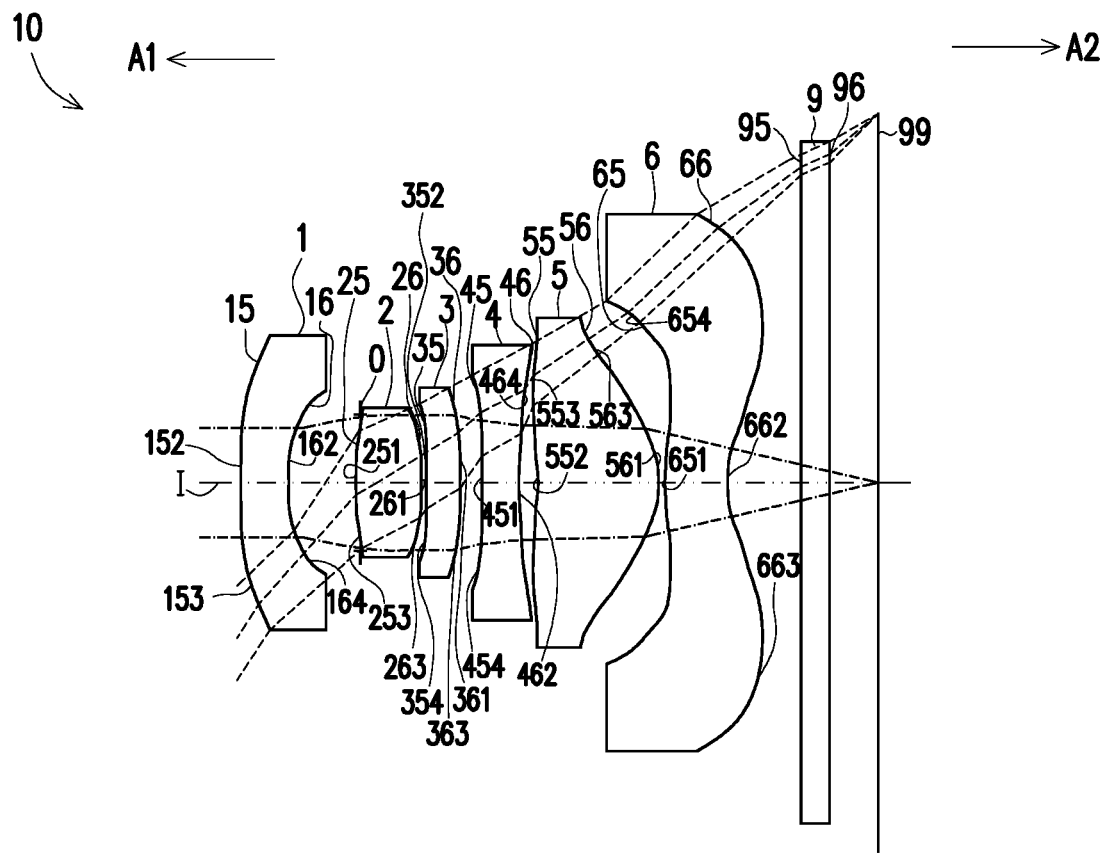
FIG. 6 is a schematic view illustrating an optical imaging lens according to a first embodiment of the invention.

FIG. 6 is a schematic view illustrating an optical imaging lens according to a first embodiment of the invention, and FIG. 7A to FIG. 7D are diagrams illustrating longitudinal spherical aberration and other aberrations of the optical imaging lens according to the first embodiment. Referring to FIG. 6, an optical imaging lens 10 in the first embodiment of the invention includes a first lens element 1, an aperture stop 0, a second lens element 2, a third lens element 3, a fourth lens element 4, a fifth lens element 5, a sixth lens element 6 and a filter 9 arranged in sequence from the object side A1 to the image side A2 along the optical axis I. When rays emitted from an object to be captured enters the optical imaging lens 10, the rays sequentially pass through the first lens element 1, the aperture stop 0, the second lens element 2, the third lens element 3, the fourth lens element 4, the fifth lens element 5, the sixth lens element 6, and the filter 9 and an image may be formed on an image plane 99. The filter 9 is, for example, an infrared cut-off filter, disposed between the sixth lens element 6 and the image plane 99. It should be noted that, the object side A1 is one side that faces the to-be-photographed object, and the image side A2 is one side that faces the image plane 99.

In this embodiment, each of the first lens element 1, the second lens element 2, the third lens element 3, the fourth lens element 4, the fifth lens element 5, the sixth lens element 6 and the filter 9 of the optical imaging lens 10 includes an image-side surface 15, 25, 35, 45, 55, 65, 95 facing the object side A1 and allowing the imaging rays to pass through and an image-side surface 16, 26, 36, 46, 56, 66, 96 facing the image side A2 and allowing the imaging rays to pass through. In this embodiment, the aperture stop 0 is disposed between the first lens element 1 and the second lens element 2.

The first lens element 1 has negative refracting power. The first lens element 1 is made of plastic material. An optical axis region 152 of the object-side surface 15 of the first lens element 1 is concave, and a periphery region 153 thereof is convex. An optical axis region 162 of the image-side surface 16 of the first lens element 1 is concave, and a periphery region 164 thereof is concave. In this embodiment, the object-side surface 15 and the image-side surface 16 of the first lens element 1 are aspheric surfaces.

The second lens element 2 has positive refracting power. The second lens element 2 is made of plastic material. An optical axis region 251 of the object-side surface 25 of the second lens element 2 is convex, and a periphery region 253 thereof is convex. An optical axis region 261 of the image-side surface 26 of the second lens element 2 is convex, and a periphery region 263 thereof is convex. In this embodiment, the object-side surface 25 and the image-side surface 26 of the second lens element 2 are aspheric surfaces.

The third lens element 3 has positive refracting power. The third lens element 3 is made of plastic material. An optical axis region 352 of the object-side surface 35 of the third lens element 3 is concave, and a periphery region 354 thereof is concave. An optical axis region 361 of the image-side surface 36 of the third lens element 3 is convex, and a periphery region 363 thereof is convex. In this embodiment, the object-side surface 35 and the image-side surface 36 of the third lens element 3 are aspheric surfaces.

The fourth lens element 4 has negative refracting power. The fourth lens element 4 is made of plastic material. An optical axis region 451 of the object-side surface 45 of the fourth lens element 4 is convex, and a periphery region 454 thereof is concave. An optical axis region 462 of the image-side surface 46 of the fourth lens element 4 is concave, and a periphery region 464 thereof is concave. In this embodiment, the object-side surface 45 and the image-side surface 46 of the fourth lens element 4 are aspheric surfaces.

The fifth lens element 5 has positive refracting power. The fifth lens element 5 is made of plastic material. An optical axis region 552 of the object-side surface 55 of the fifth lens element 5 is concave, and a periphery region 553 thereof is convex. An optical axis region 561 of the image-side surface 56 of the fifth lens element 5 is convex, and a periphery region 563 thereof is convex. In this embodiment, the object-side surface 55 and the image-side surface 56 of the fifth lens element 5 are aspheric surfaces.

The sixth lens element 6 has negative refracting power. The sixth lens element 6 is made of plastic material. An optical axis region 651 of the object-side surface 65 of the sixth lens element 6 is convex, and a periphery region 654 thereof is concave. An optical axis region 662 of the image-side surface 66 of the sixth lens element 6 is concave, and a periphery region 663 thereof is convex. In this embodiment, the object-side surface 65 and the image-side surface 66 of the sixth lens element 6 are aspheric surfaces.

Other detailed optical data of the first embodiment are shown in FIG. 8, and the optical imaging lens 10 of the first embodiment has an overall effective focal length (EFL) thereof being 2.060 mm (millimeter), a half field of view (HFOV) thereof being 58.500°, a system length thereof being 5.065 mm, a F-number (Fno) thereof being 2.250, and an image height thereof being 2.883 mm, wherein the system length refers to a distance from the object-side surface 15 of the first lens element 1 to the image plane 99 along the optical axis I.

Further, in this embodiment, all of the object-side surfaces 15, 25, 35, 45, 55, and 65 and the image-side surfaces 16, 26, 36, 46, 56, and 66 of the first lens element 1, the second lens element 2, the third lens element 3, the fourth lens element 4, the fifth lens element 5 and the sixth lens element 6 (12 surfaces in total) are even aspheric surfaces, and these aspheric surfaces are defined by the following equation:

$$Z(Y) = \frac{Y^2}{R} \bigg/ \left(1 + \sqrt{1 - (1+K)\frac{Y^2}{R^2}}\right) + \sum_{i=1}^{n} a_i \times Y^i \quad (1)$$

Y: a distance from a point on an aspheric curve to the optical axis;
Z: a depth of the aspheric surface;
(a perpendicular distance between the point on the aspheric surface that is spaced from the optical axis by the distance Y and a tangent plane tangent to a vertex of the aspheric surface on the optical axis);
R: a radius of curvature of the surface of the lens element;
K: a conic constant;
$a_i$: an $i^{th}$ aspheric coefficient.

The aspheric coefficients of the object-side surface 15 of the first lens element 1 to the image-side surface 66 of the sixth lens element 6 in Equation (1) are shown in FIG. 9. In FIG. 9, a field marked by "15" indicates that the respective row includes the aspheric coefficients of the object-side surface 15 of the first lens element 1, and the same applies to the rest of fields.

In addition, the relationship among the important parameters in the optical imaging lens 10 of the first embodiment is shown in FIG. 46, wherein the unit for each parameter in FIG. 46 is millimeter (mm). Further, a column under "First" in the table of FIG. 46 indicates relevant optical parameters in the first embodiment, and the same also applies to the rest of "Second", "Third", "Fourth" and "Fifth".

Therein,
T1 is a thickness of the first lens element 1 along the optical axis I;
T2 is a thickness of the second lens element 2 along the optical axis I;
T3 is a thickness of the third lens element 3 along the optical axis I;
T4 is a thickness of the fourth lens element 4 along the optical axis I;
T5 is a thickness of the fifth lens element 5 along the optical axis I;
T6 is a thickness of the sixth lens element 6 along the optical axis I;
G12 is a distance from the image-side surface 16 of the first lens element 1 to the object-side surface 25 of the second lens element 2 along the optical axis I, i.e., an air gap between the first lens element 1 and the second lens element 2 along the optical axis I;
G23 is a distance from the image-side surface 26 of the second lens element 2 to the object-side surface 35 of the third lens element 3 along the optical axis I, i.e., an air gap between the second lens element 2 and the third lens element 3 along the optical axis I;
G34 is a distance from the image-side surface 36 of the third lens element 3 to the object-side surface 45 of the fourth lens element 4 along the optical axis I, i.e., an air gap between the third lens element 3 and the fourth lens element 4 along the optical axis I;
G45 is a distance from the image-side surface 46 of the fourth lens element 4 to the object-side surface 55 of the fifth lens element 5 along the optical axis I, i.e., an air gap between the fourth lens element 4 and the fifth lens element 5 along the optical axis I;
G56 is a distance from the image-side surface 56 of the fifth lens element 5 to the object-side surface 65 of the sixth lens element 6 along the optical axis I, i.e., an air gap between the fifth lens element 5 and the sixth lens element 6 along the optical axis I;
AAG is a sum of the five air gaps of the first lens element 1 to the sixth lens element 6 along the optical axis I, i.e., a sum of G12, G23, G34, G45 and G56;
ALT is a sum of the six lens thicknesses of the first lens element 1 to the sixth lens element 6 along the optical axis I, i.e., a sum of T1, T2, T3, T4, T5 and T6;
TL is a distance from the object-side surface 15 of the first lens element 1 to the image-side surface 66 of the sixth lens element 6 along the optical axis I;
TTL is a distance from the object-side surface 15 of the first lens element 1 to the image plane 99 along the optical axis I;
BFL is a distance from the image-side surface 66 of the sixth lens element 6 to the image plane 99 along the optical axis I;
ImgH is an image height of the optical imaging lens 10; and
EFL is a system focal length of the optical imaging lens 10, i.e., the effective focal length (EFL) of the optical imaging lens 10 overall.
Besides, it is further defined that:
G6F is an air gap from the sixth lens element 6 to the filter 9 along the optical axis I;
TF is a thickness of the filter 9 along the optical axis I;
GFP is an air gap from the filter 9 to the image plane 99 along the optical axis I;
f1 is a focal length of the first lens element 1;
f2 is a focal length of the second lens element 2;
f3 is a focal length of the third lens element 3;
f4 is a focal length of the fourth lens element 4;
f5 is a focal length of the fifth lens element 5;
f6 is a focal length of the sixth lens element 6;
n1 is a refractive index of the first lens element 1;
n2 is a refractive index of the second lens element 2;

n3 is a refractive index of the third lens element 3;
n4 is a refractive index of the fourth lens element 4;
n5 is a refractive index of the fifth lens element 5;
n6 is a refractive index of the sixth lens element 6;
V1 is an Abbe number of the first lens element 1;
V2 is an Abbe number of the second lens element 2;
V3 is an Abbe number of the third lens element 3;
V4 is an Abbe number of the fourth lens element 4;
V5 is an Abbe number of the fifth lens element 5; and
V6 is an Abbe number of the sixth lens element 6.

Figures 7A, 7B, 7C, 7D:
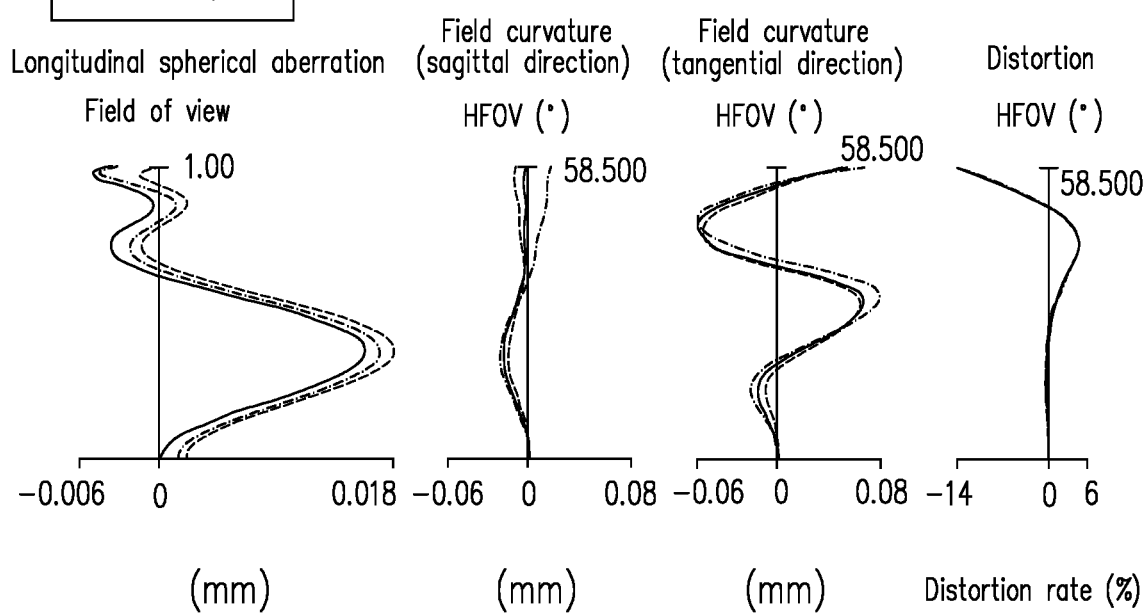
FIG. 7A to FIG. 7D are diagrams illustrating longitudinal spherical aberration and other aberrations of the optical imaging lens according to the first embodiment.

With reference to FIG. 7A to FIG. 7D, the diagram of FIG. 7A illustrates longitudinal spherical aberration of the first embodiment; the diagrams of FIG. 7B and FIG. 7C respectively illustrate the field curvature aberration in the sagittal direction and the field curvature aberration in the tangential direction on the image plane 99 when wavelengths are 470 nm, 555 nm and 650 nm in the first embodiment; the diagram of FIG. 7D illustrates the distortion aberration on the image plane 99 when the wavelengths are 470 nm, 555 nm and 650 nm in the first embodiment. In FIG. 7A which illustrates the longitudinal spherical aberration in the first embodiment when the pupil radius is 0.4577 mm, the curve of each wavelength is close to one another and approaches the middle position, which represents that the off-axis rays of wavelengths at different heights are focused near the imaging point. The skew margin of the curve of each wavelength represents that the imaging point deviation of the off-axis rays at different heights is controlled within a range of ±0.018 mm. Therefore, it is evident that the first embodiment can significantly improve spherical aberration of the same wavelength. In addition, the curves of the three representative wavelengths are close to one another, which represents that the imaging positions of the rays with different wavelengths are concentrated. Therefore, the chromatic aberration can also be significantly improved.

In FIG. 7B and FIG. 7C which illustrate two diagrams of field curvature aberrations, the field curvature aberrations of the three representative wavelengths in the entire field of view fall within a range of ±0.08 mm, which represents that the optical system of the first embodiment can effectively eliminate aberration. In FIG. 7D, the diagram of distortion aberration shows that the distortion aberration in the first embodiment is maintained within a range of ±14%, which represents that the distortion aberration in the first embodiment can comply with the imaging quality required by the optical system. Accordingly, compared to the existing optical lenses, with the system length shortened to approximately 5.065 mm, the first embodiment can still provide favorable imaging quality.

Figure 10:
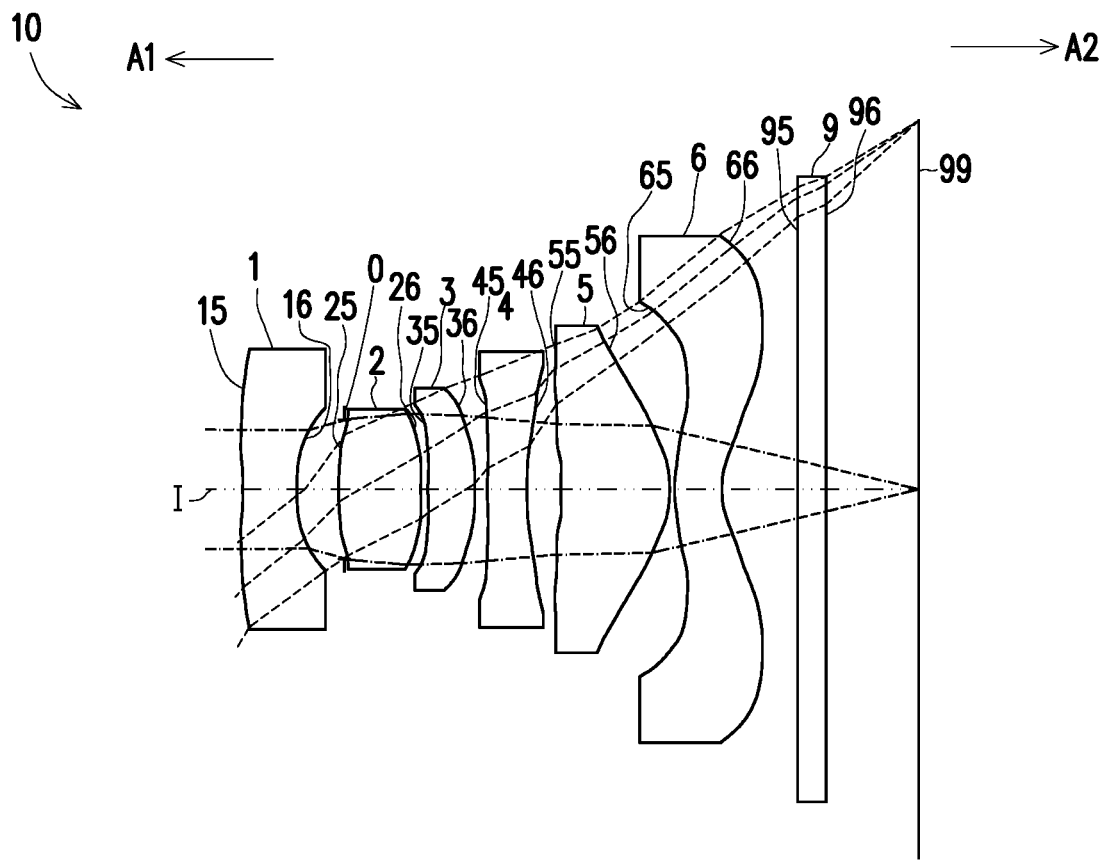
FIG. 10 is a schematic view illustrating an optical imaging lens according to a second embodiment of the invention.

FIG. 10 is a schematic view illustrating an optical imaging lens according to a second embodiment of the invention, and FIG. 11A to FIG. 11D are diagrams illustrating a longitudinal spherical aberration and other aberrations of the optical imaging lens according to the second embodiment. With reference to FIG. 10, the second embodiment of the optical imaging lens 10 is substantially similar to the first embodiment, and the difference between the two is that, the optical data, the aspheric coefficients, and the parameters of the lens elements 1, 2, 3, 4, 5 and 6 in these embodiments are different to some extent. For clear illustration, it should be noted that the same reference numbers of the optical axis regions and the periphery regions with shapes similar to those in the first embodiment are omitted in FIG. 10.

Detailed optical data of the optical imaging lens 10 of the second embodiment are shown in FIG. 12. In the optical imaging lens 10 of the second embodiment, an overall effective focal length (EFL) thereof is 2.147 millimeter (mm), a half field of view (HFOV) thereof is 58.500°, an F-number thereof (Fno) is 2.250, a system length (TTL) thereof is 5.319 mm and an image height is 2.884 mm.

FIG. 13 shows the aspheric coefficients of the object-side surface 15 of the first lens element 1 to the image-side surface 66 of the sixth lens element 6 in Equation (1) according to the second embodiment.

In addition, the relationship among the important parameters in the optical imaging lens 10 of the second embodiment is shown in FIG. 46.

Figures 11A, 11B, 11C, 11D:
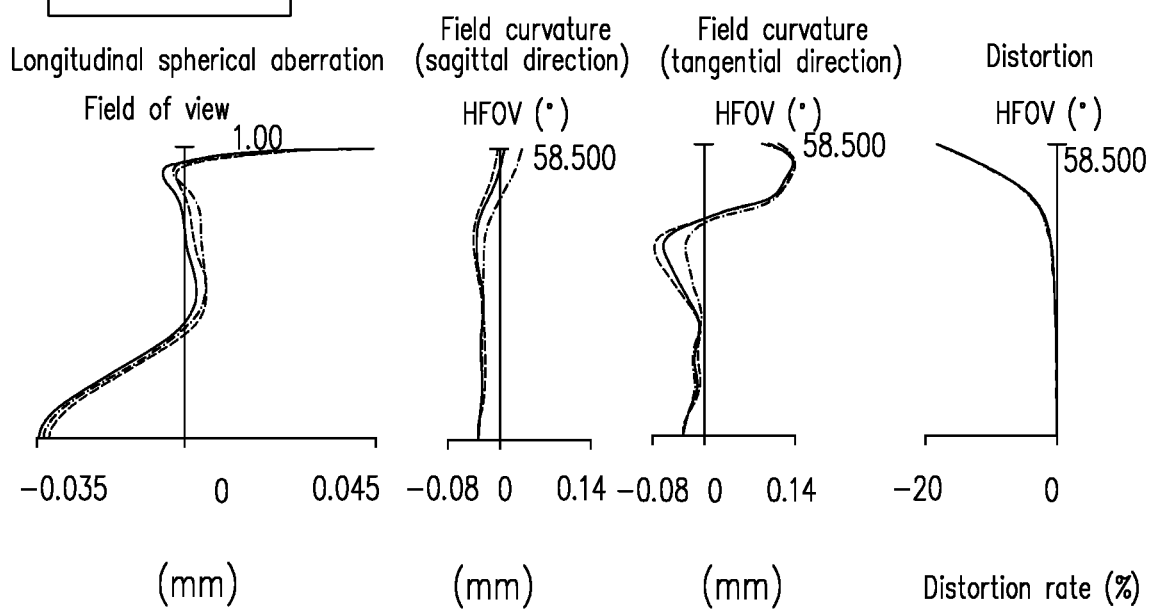
FIG. 11A to FIG. 11D are diagrams illustrating a longitudinal spherical aberration and other aberrations of the optical imaging lens according to the second embodiment.

In the diagram of FIG. 11A which illustrates the longitudinal spherical aberration when the pupil radius is 0.4772 mm according to the second embodiment, the imaging point deviation of the off-axis rays at different heights is controlled within a range of ±0.045 mm. In FIG. 11B and FIG. 11C which illustrate two diagrams of the field curvature aberrations, the field curvature aberrations of the three representative wavelengths in the entire field of view fall within a range of ±0.14 mm. In FIG. 11D, the diagram of distortion aberration shows that the distortion aberration in the second embodiment is maintained within a range of ±18%. Accordingly, compared to the first embodiment, with the system length shortened to approximately 5.319 mm, the second embodiment can still provide favorable imaging quality.

In view of the above description, compared to the first embodiment, the advantage of the second embodiment lies in that, because each lens element has a smaller difference between the thicknesses of the optical axis region and the periphery region, the second embodiment is easier to manufacture than the first embodiment and thus has a higher yield rate.

Figure 14:
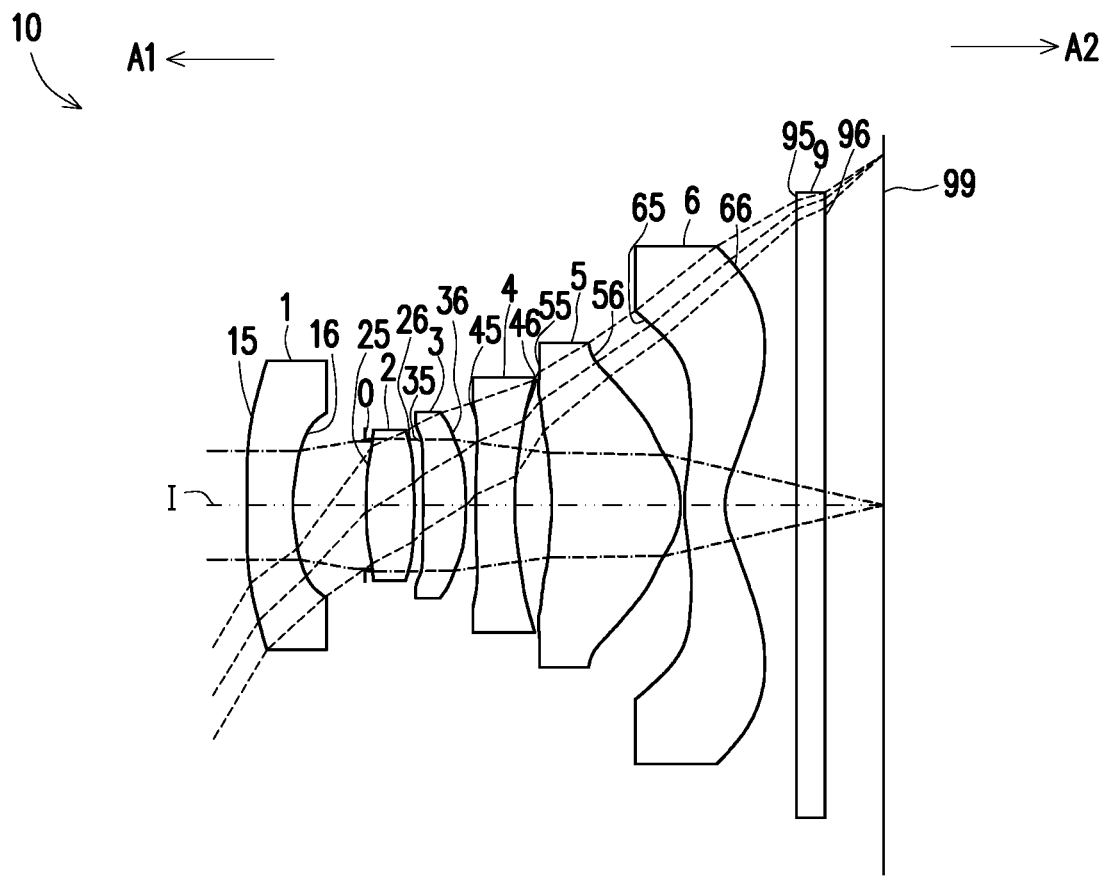
FIG. 14 is a schematic view illustrating an optical imaging lens according to a third embodiment of the invention.

FIG. 14 is a schematic view illustrating an optical imaging lens according to a third embodiment of the invention, and FIG. 15A to FIG. 15D are diagrams illustrating longitudinal spherical aberration and other aberrations of the optical imaging lens according to the third embodiment. With reference to FIG. 14, the third embodiment of the optical imaging lens 10 is substantially similar to the first embodiment, and the difference between the two is that, the optical data, the aspheric coefficients, and the parameters of the lens elements 1, 2, 3, 4, 5 and 6 in these embodiments are different to some extent. For clear illustration, it should be noted that the same reference numbers of the optical axis regions and the periphery regions with shapes similar to those in the first embodiment are omitted in FIG. 14.

Detailed optical data of the optical imaging lens 10 of the third embodiment are shown in FIG. 16. In the optical imaging lens 10 of the third embodiment, an overall effective focal length thereof (EFL) is 2.022 millimeter (mm), a half field of view (HFOV) thereof is 58.519°, an F-number (Fno) thereof is 2.250, a system length (TTL) thereof is 5.226 mm and an image height thereof is 3.030 mm.

FIG. 17 shows the aspheric coefficients of the object-side surface 15 of the first lens element 1 to the image-side surface 66 of the sixth lens element 6 in Equation (1) according to the third embodiment.

In addition, the relationship among the important parameters in the optical imaging lens 10 of the third embodiment is shown in FIG. 46.

Figures 15A, 15B, 15C, 15D:
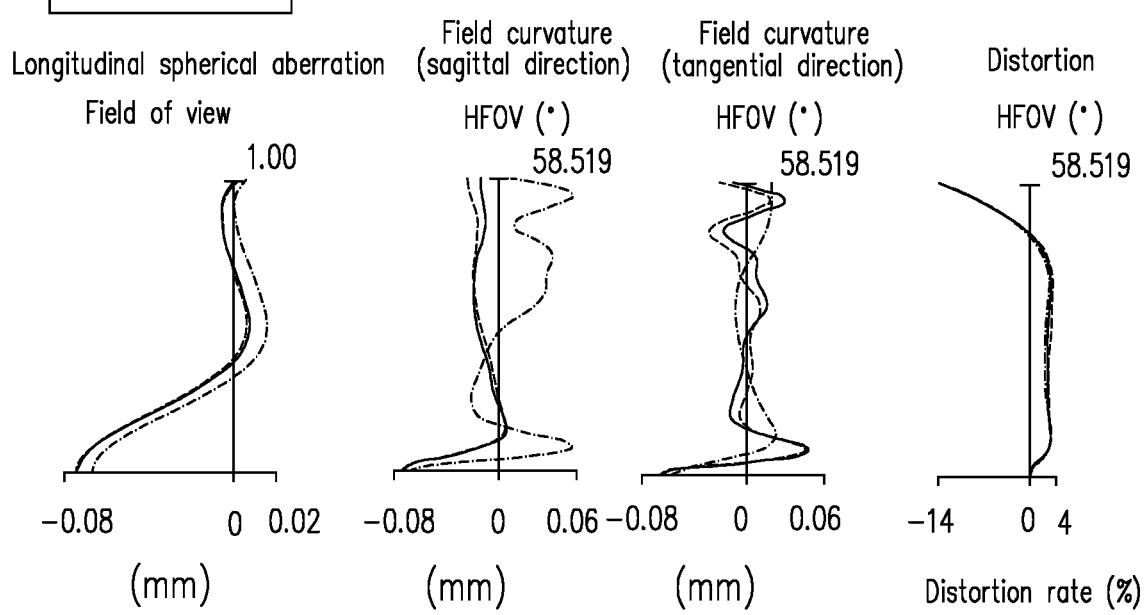
FIG. 15A to FIG. 15D are diagrams illustrating longitudinal spherical aberration and other aberrations of the optical imaging lens according to the third embodiment.

In the diagram of FIG. 15A which illustrates the longitudinal spherical aberration when the pupil radius is 0.4493 mm according to the third embodiment, the imaging point deviation of the off-axis rays at different heights is controlled within a range of ±0.08 mm. In FIG. 15B and FIG. 15C which illustrate two diagrams of the field curvature aberrations, the field curvature aberrations of the three representative wavelengths in the entire field of view fall within a range of ±0.08 mm. In FIG. 15D, the diagram of distortion aberration shows that the distortion aberration in the third embodiment is maintained within a range of ±14%. Accordingly, compared to the first embodiment, with the system length shortened to approximately 5.226 mm, the third embodiment can still provide favorable imaging quality.

In view of the above description, compared to the first embodiment, the advantage of the third embodiment lies in that the half field of view of the third embodiment is greater than the half field of view of the first embodiment.

Figure 18:
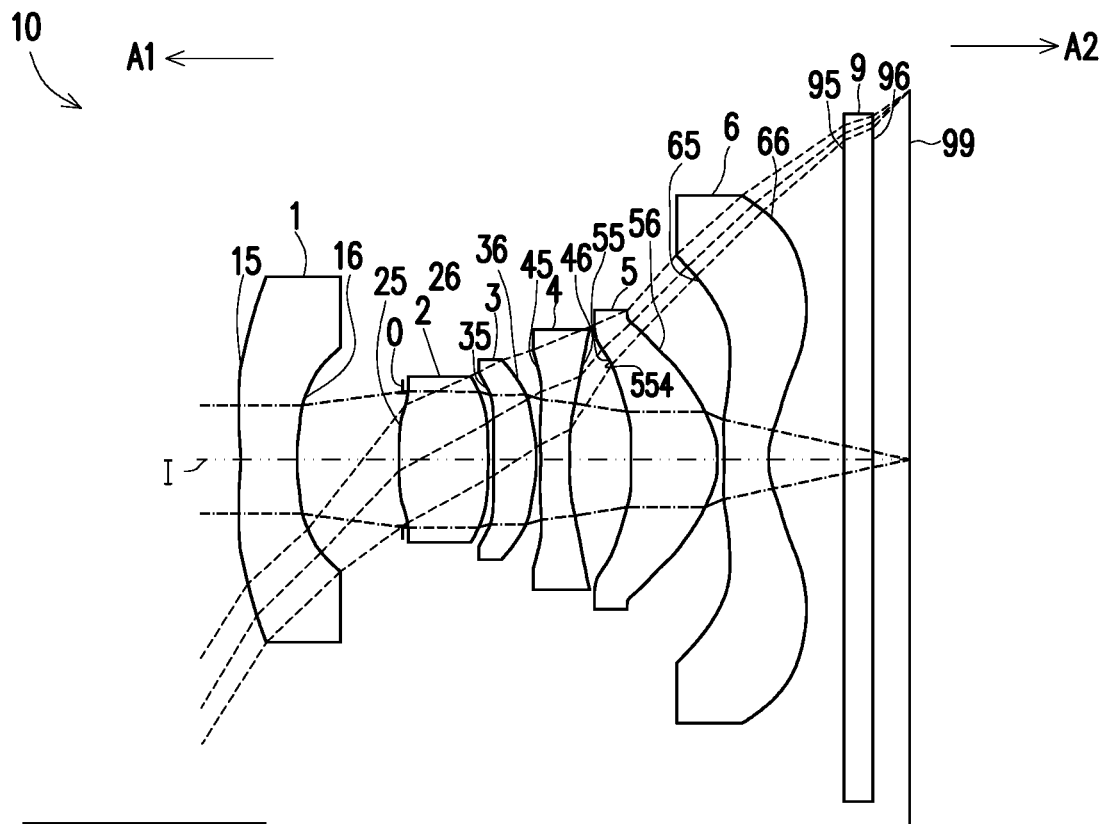
FIG. 18 is a schematic view illustrating an optical imaging lens according to a fourth embodiment of the invention.

FIG. 18 is a schematic view illustrating an optical imaging lens according to a fourth embodiment of the invention, and FIG. 19A to FIG. 19D are diagrams illustrating longitudinal spherical aberration and other aberrations of the optical imaging lens according to the fourth embodiment. With reference to FIG. 18, the fourth embodiment of the optical imaging lens 10 is substantially similar to the first embodiment, and the difference between the two is that, the optical data, the aspheric coefficients, and the parameters of the lens elements 1, 2, 3, 4, 5 and 6 in these embodiments are different to some extent. In addition, in the fourth embodiment, a periphery region 554 of the object-side surface 55 of the fifth lens element 5 is concave. For clear illustration, it should be noted that the same reference numbers of the optical axis regions and the periphery regions with shapes similar to those in the first embodiment are omitted in FIG. 18.

Detailed optical data of the optical imaging lens 10 of the fourth embodiment are shown in FIG. 20. In the optical imaging lens 10 of the fourth embodiment, an overall effective focal length (EFL) thereof is 1.939 millimeter (mm), a half field of view (HFOV) thereof is 58.519°, an F-number (Fno) thereof is 2.250, a system length (TTL) is 5.247 mm and an image height thereof is 2.836 mm.

FIG. 21 shows the aspheric coefficients of the object-side surface 15 of the first lens element 1 to the image-side surface 66 of the sixth lens element 6 in Equation (1) according to the fourth embodiment.

In addition, the relationship among the important parameters in the optical imaging lens 10 of the fourth embodiment is shown in FIG. 46.

Figures 19A, 19B, 19C, 19D:
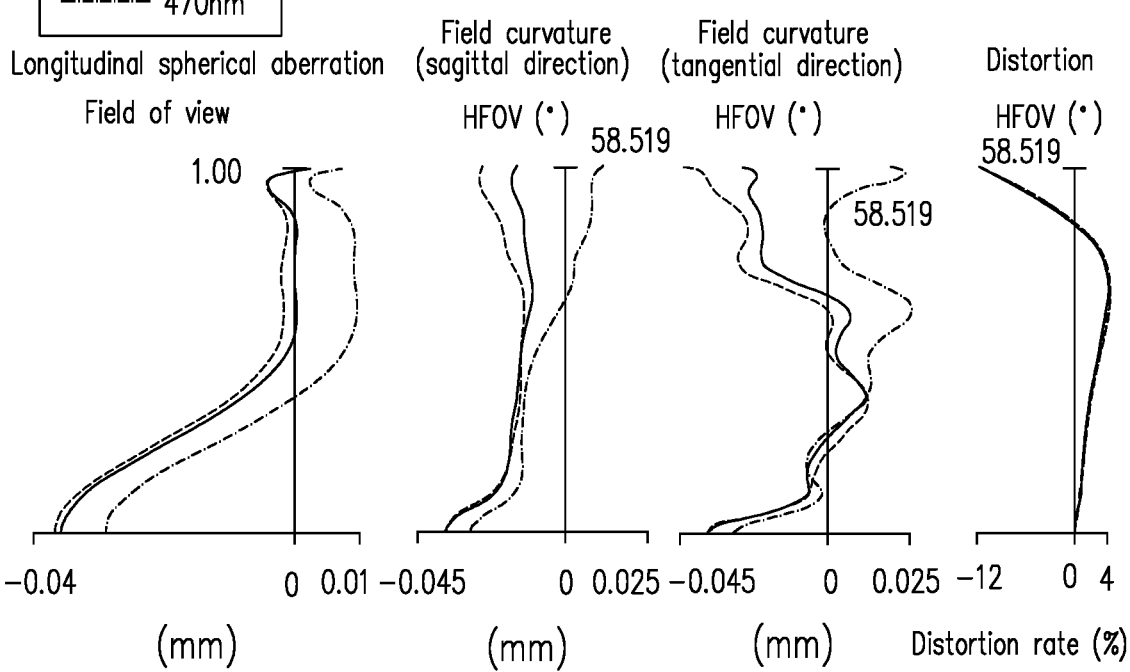
FIG. 19A to FIG. 19D are diagrams illustrating longitudinal spherical aberration and other aberrations of the optical imaging lens according to the fourth embodiment.

In the diagram of FIG. 19A which illustrates the longitudinal spherical aberration when the pupil radius is 0.4310 mm according to the fourth embodiment, the imaging point deviation of the off-axis rays at different heights is controlled within a range of ±0.038 mm. In FIG. 19B and FIG. 19C which illustrate two diagrams of the field curvature aberrations, the field curvature aberrations of the three representative wavelengths in the entire field of view fall within a range of ±0.045 mm. In FIG. 19D, the diagram of distortion aberration shows that the distortion aberration in the fourth embodiment is maintained within a range of ±12%. Accordingly, compared to the first embodiment, with the system length shortened to approximately 5.247 mm, the fourth embodiment can still provide favorable imaging quality.

In view of the above description, compared to the first embodiment, the advantage of the fourth embodiment lies in that, the half field of view of the fourth embodiment is greater than the half field of view of the first embodiment, and the distortion aberration of the fourth embodiment is less than the distortion aberration of the first embodiment.

FIG. 22 is a schematic view illustrating an optical imaging lens according to a fifth embodiment of the invention, and FIG. 23A to FIG. 23D are diagrams illustrating longitudinal spherical aberration and other aberrations of the optical imaging lens according to the fifth embodiment. With reference to FIG. 22, the fifth embodiment of the optical imaging lens 10 is substantially similar to the first embodiment, and the difference between the two is that, the optical data, the aspheric coefficients, and the parameters of the lens elements 1, 2, 3, 4, 5 and 6 in these embodiments are different to some extent. In addition, in the fifth embodiment, an optical axis region 151 of the object-side surface 15 of the first lens element 1 is convex, and the periphery region 554 of the object-side surface 55 of the fifth lens element 5 is concave. For clear illustration, it should be noted that the same reference numbers of the optical axis regions and the periphery regions with shapes similar to those in the first embodiment are omitted in FIG. 22.

Detailed optical data of the optical imaging lens 10 of the fifth embodiment are shown in FIG. 24. In the optical imaging lens 10 of the fifth embodiment, an overall effective focal length (EFL) thereof is 2.046 millimeter (mm), a half field of view (HFOV) thereof is 58.519°, an F-number (Fno) thereof is 2.250, a system length (TTL) thereof is 4.643 mm and an image height thereof is 2.783 mm.

FIG. 25 shows the aspheric coefficients of the object-side surface 25 of the first lens element 1 to the image-side surface 66 of the sixth lens element 6 in Equation (1) according to the fifth embodiment.

In addition, the relationship among the important parameters in the optical imaging lens 10 of the fifth embodiment is shown in FIG. 46.

In the diagram of FIG. 23A which illustrates the longitudinal spherical aberration when the pupil radius is 0.4547 mm according to the fifth embodiment, the imaging point deviation of the off-axis rays at different heights is controlled within a range of ±0.015 mm. In FIG. 23B and FIG. 23C which illustrate two diagrams of the field curvature aberrations, the field curvature aberrations of the three representative wavelengths in the entire field of view fall within a range of ±0.2 mm. In FIG. 23D, the diagram of distortion aberration shows that the distortion aberration in the fifth embodiment is maintained within a range of ±17%. Accordingly, compared to the first embodiment, with the system length shortened to approximately 4.643 mm, the fifth embodiment can still provide favorable imaging quality.

In view of the above description, compared to the first embodiment, the advantage of the fifth embodiment lies in that, the system length of the fifth embodiment is less than the system length of the first embodiment, the half field of view of the fifth embodiment is greater than the half field of view of the first embodiment, and the longitudinal spherical aberration of the fifth embodiment is less than the longitudinal spherical aberration of the first embodiment.

Figure 26:
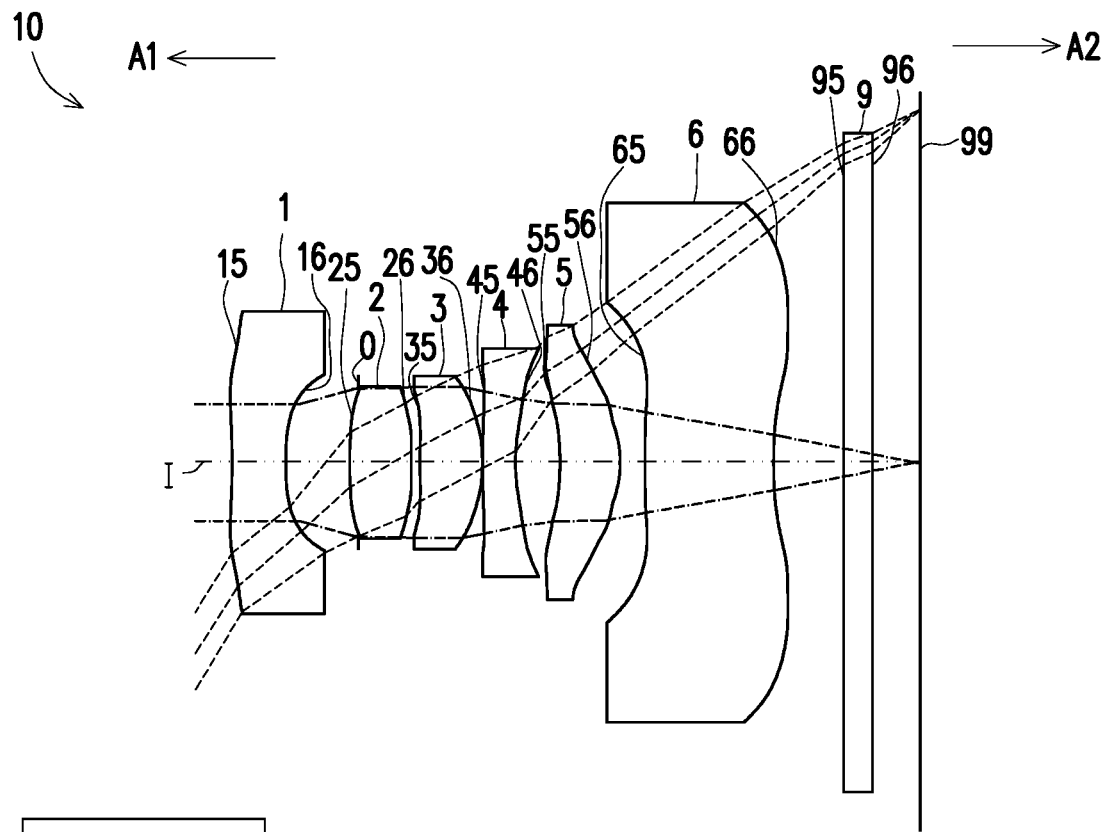
FIG. 26 is a schematic view illustrating an optical imaging lens according to a sixth embodiment of the invention.

FIG. 26 is a schematic view illustrating an optical imaging lens according to a sixth embodiment of the invention, and FIG. 27A to FIG. 27D are diagrams illustrating longitudinal spherical aberration and other aberrations of the optical imaging lens according to the sixth embodiment. With reference to FIG. 26, the sixth embodiment of the optical imaging lens 10 is substantially similar to the first embodiment, and the difference between the two is that, the optical data, the aspheric coefficients, and the parameters of the lens elements 1, 2, 3, 4, 5 and 6 in these embodiments are different to some extent. For clear illustration, it should be noted that the same reference numbers of the optical axis regions and the periphery regions with shapes similar to those in the first embodiment are omitted in FIG. 26.

Detailed optical data of the optical imaging lens 10 of the sixth embodiment are shown in FIG. 28. In the optical imaging lens 10 of the sixth embodiment, an overall effective focal length (EFL) thereof is 2.237 millimeter (mm), a half field of view (HFOV) thereof is 58.519°, an F-number (Fno) thereof is 2.250, a system length (TTL) thereof is 5.677 mm and an image height thereof is 2.922 mm.

FIG. 29 shows the aspheric coefficients of the object-side surface 15 of the first lens element 1 to the image-side surface 66 of the sixth lens element 6 in Equation (1) according to the sixth embodiment.

In addition, the relationship among the important parameters in the optical imaging lens 10 of the sixth embodiment is shown in FIG. 47. Here, the unit for each parameter in FIG. 47 is millimeter (mm). Further, a column under "Sixth" in the table of FIG. 47 represents relevant optical parameters in the first embodiment, and the same also applies to the rest of "Seventh", "Eighth", "ninth" and "Tenth".

Figures 27A, 27B, 27C, 27D:
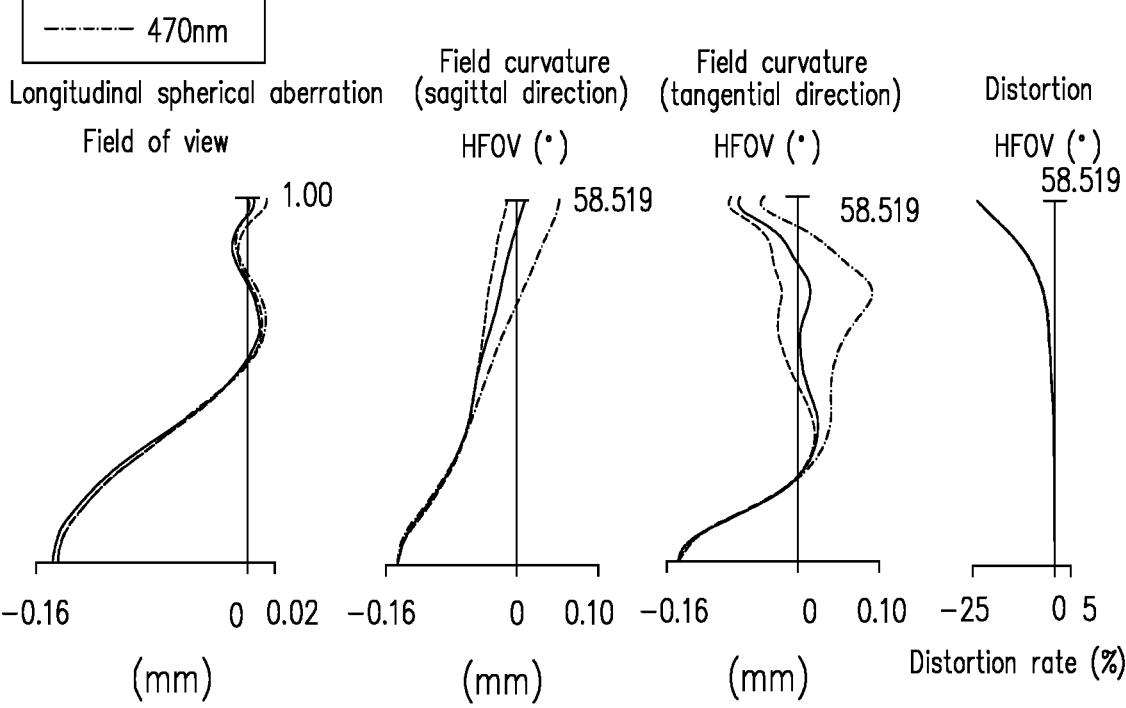
FIG. 27A to FIG. 27D are diagrams illustrating longitudinal spherical aberration and other aberrations of the optical imaging lens according to the sixth embodiment.

In the diagram of FIG. 27A which illustrates the longitudinal spherical aberration when the pupil radius is 0.4971 mm according to the sixth embodiment, the imaging point deviation of the off-axis rays at different heights is controlled within a range of ±0.15 mm. In FIG. 27B and FIG. 27C which illustrate two diagrams of the field curvature aberrations, the field curvature aberrations of the three representative wavelengths in the entire field of view fall within a range of ±0.16 mm. In FIG. 27D, the diagram of distortion aberration shows that the distortion aberration in the sixth embodiment is maintained within a range of ±25%. Accordingly, compared to the first embodiment, with the system length shortened to approximately 5.677 mm, the sixth embodiment can still provide favorable imaging quality.

In view of the above description, compared to the first embodiment, the advantage of the sixth embodiment lies in that, the half field of view of the sixth embodiment is greater than the half field of view of the first embodiment.

Figure 30:
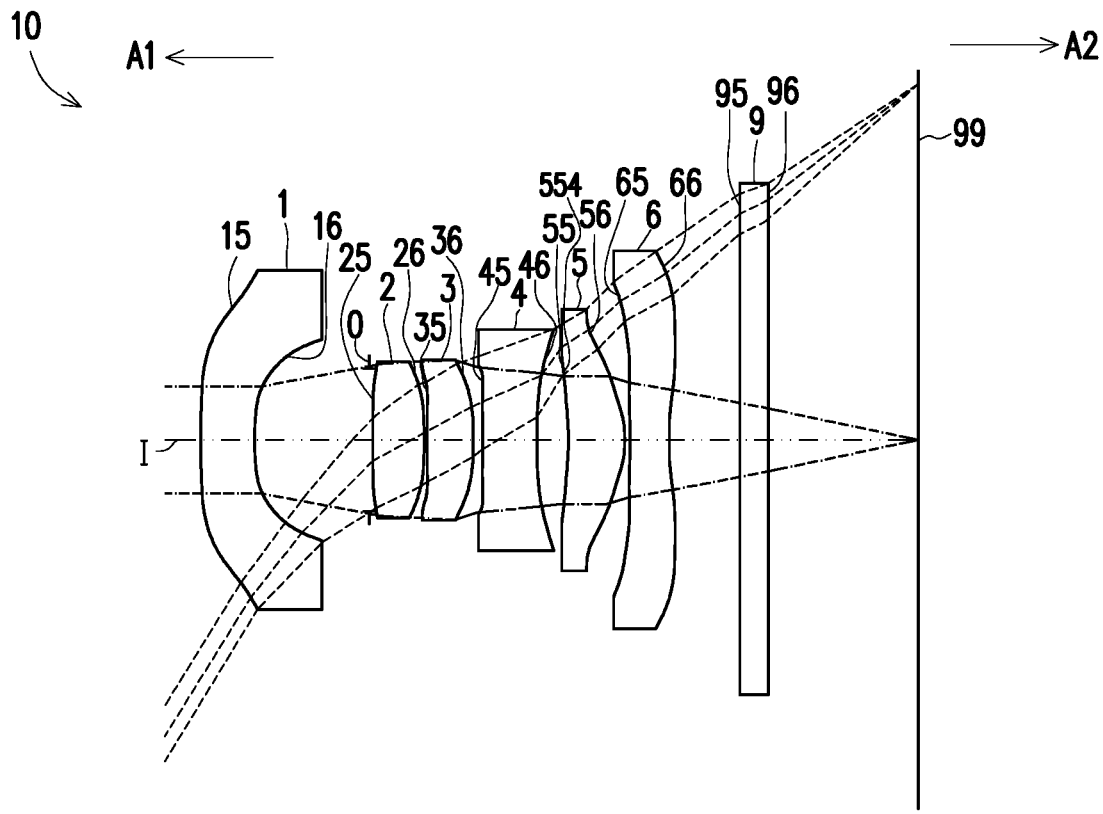
FIG. 30 is a schematic view illustrating an optical imaging lens according to a seventh embodiment of the invention.

FIG. 30 is a schematic view illustrating an optical imaging lens according to a seventh embodiment of the invention, and FIG. 31A to FIG. 31D are diagrams illustrating longitudinal spherical aberration and other aberrations of the optical imaging lens according to the seventh embodiment. With reference to FIG. 30, the seventh embodiment of the optical imaging lens 10 is substantially similar to the first embodiment, and the difference between the two is that, the optical data, the aspheric coefficients, and the parameters of the lens elements 1, 2, 3, 4, 5 and 6 in these embodiments are different to some extent. In addition, in the seventh embodiment, the periphery region 554 of the object-side surface 55 of the fifth lens element 5 is concave. For clear illustration, it should be noted that the same reference numbers of the optical axis regions and the periphery regions with shapes similar to those in the first embodiment are omitted in FIG. 30.

Detailed optical data of the optical imaging lens 10 of the seventh embodiment are shown in FIG. 32. In the optical imaging lens 10 of the seventh embodiment, an overall effective focal length (EFL) thereof is 2.105 millimeter (mm), a half field of view (HFOV) thereof is 58.519°, an F-number (Fno) thereof is 2.250, a system length (TTL) thereof is 5.907 mm and an image height thereof is 2.926 mm.

FIG. 33 shows the aspheric coefficients of the object-side surface 15 of the first lens element 1 to the image-side surface 66 of the sixth lens element 6 in Equation (1) according to the seventh embodiment.

In addition, the relationship among the important parameters in the optical imaging lens 10 of the seventh embodiment is shown in FIG. 47.

Figures 31A, 31B, 31C, 31D:
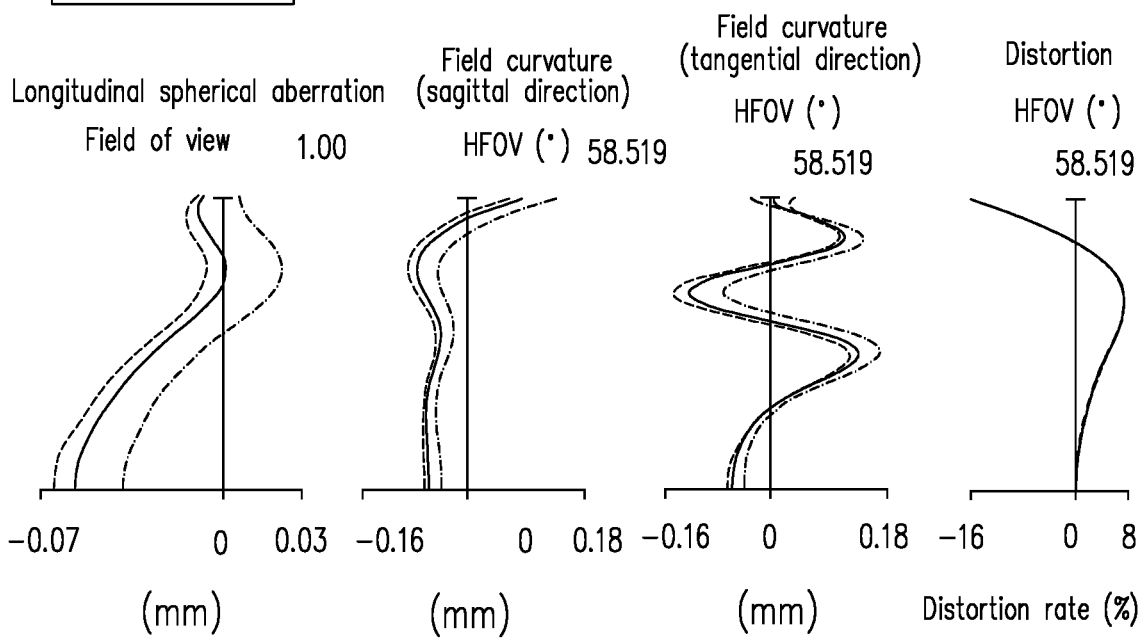
FIG. 31A to FIG. 31D are diagrams illustrating longitudinal spherical aberration and other aberrations of the optical imaging lens according to the seventh embodiment.

In the diagram of FIG. 31A which illustrates the longitudinal spherical aberration when the pupil radius is 0.4677 mm according to the seventh embodiment, the imaging point deviation of the off-axis rays at different heights is controlled within a range of ±0.065 mm. In FIG. 31B and FIG. 31C which illustrate two diagrams of the field curvature aberrations, the field curvature aberrations of the three representative wavelengths in the entire field of view fall within a range of ±0.18 mm. In FIG. 31D, the diagram of distortion aberration shows that the distortion aberration in the seventh embodiment can be maintained within a range of ±16%. Accordingly, compared to the first embodiment, with the system length shortened to approximately 5.907 mm, the seventh embodiment can still provide favorable imaging quality.

According to the above description, compared to the first embodiment, the advantage of the seventh embodiment lies in that, the half field of view of the seventh embodiment is greater than the half field of view of the first embodiment.

FIG. 34 is a schematic view illustrating an optical imaging lens according to an eighth embodiment of the invention, and FIG. 35A to FIG. 35D are diagrams illustrating longitudinal spherical aberration and other aberrations of the optical imaging lens according to the eighth embodiment. With reference to FIG. 34, the eighth embodiment of the optical imaging lens 10 is substantially similar to the first embodiment, and the difference between the two is that, the optical data, the aspheric coefficients, and the parameters of the lens elements 1, 2, 3, 4, 5 and 6 in these embodiments are different to some extent. In addition, in the eighth embodiment, the periphery region 554 of the object-side surface 55 of the fifth lens element 5 is concave. For clear illustration, it should be noted that the same reference numbers of the optical axis regions and the periphery regions with shapes similar to those in the first embodiment are omitted in FIG. 34.

Detailed optical data of the optical imaging lens 10 of the eighth embodiment are shown in FIG. 36. In the optical imaging lens 10 of the eighth embodiment, an overall effective focal length (EFL) thereof is 2.208 millimeter (mm), a half field of view (HFOV) thereof is 58.519°, an F-number (Fno) thereof is 2.250, a system length (TTL) thereof is 4.900 mm and an image height thereof is 2.900 mm.

FIG. 37 shows the aspheric coefficients of the object-side surface 15 of the first lens element 1 to the image-side surface 66 of the sixth lens element 6 in Equation (1) according to the eighth embodiment.

In addition, the relationship among the important parameters in the optical imaging lens 10 of the eighth embodiment is shown in FIG. 47.

In the diagram of FIG. 35A which illustrates the longitudinal spherical aberration when the pupil radius is 0.4907 mm according to the eighth embodiment, the imaging point deviation of the off-axis rays at different heights is controlled within a range of ±0.14 mm. In FIG. 35B and FIG. 35C which illustrate two diagrams of the field curvature aberrations, the field curvature aberrations of the three representative wavelengths in the entire field of view fall within a range of ±0.14 mm. In FIG. 35D, the diagram of distortion aberration shows that the distortion aberration in the eighth embodiment can be maintained within a range of ±25%. Accordingly, compared to the first embodiment, with the system length shortened to approximately 4.900 mm, the eighth embodiment can still provide favorable imaging quality.

In view of the above description, compared to the first embodiment, the advantage of the eighth embodiment lies in that, the system length of the eighth embodiment is less than the system length of the first embodiment, and the half field of view of the eighth embodiment is greater than the half field of view of the first embodiment.

Figure 38:
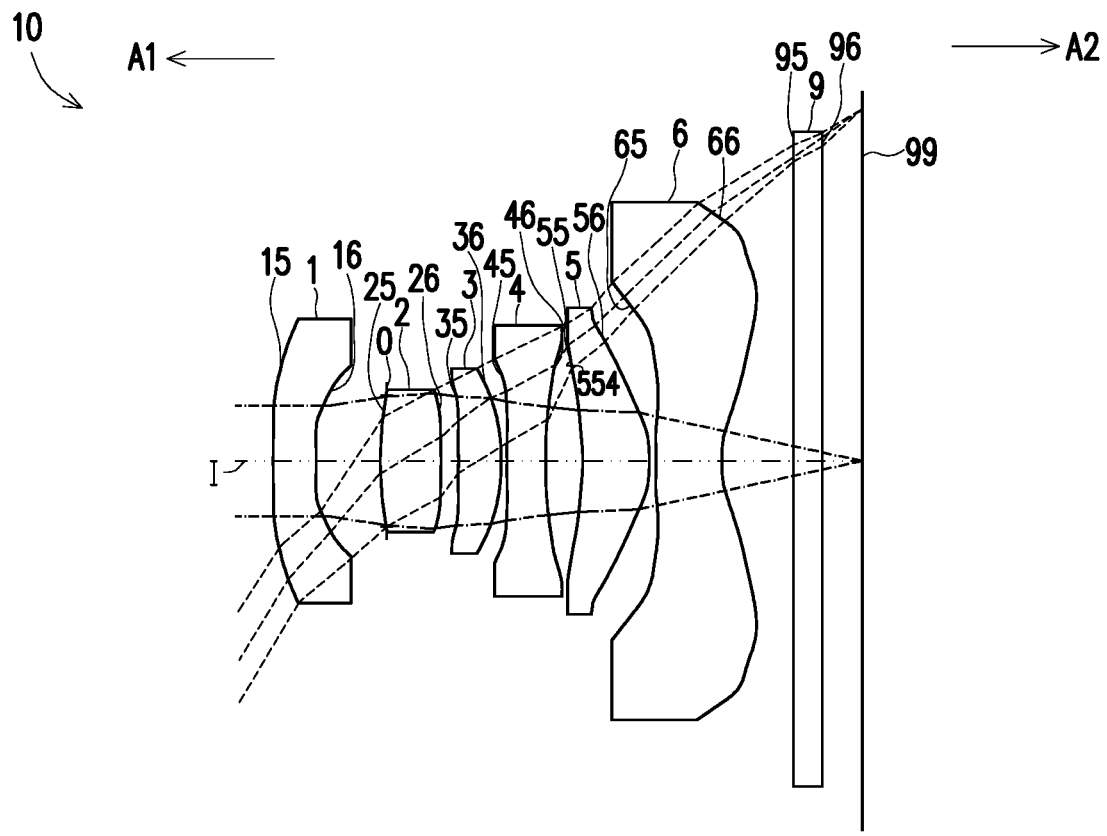
FIG. 38 is a schematic view illustrating an optical imaging lens according to a ninth embodiment of the invention.

FIG. 38 is a schematic view illustrating an optical imaging lens according to a ninth embodiment of the invention, and FIG. 39A to FIG. 39D are diagrams illustrating a longitudinal spherical aberration and other aberrations of the optical imaging lens according to the ninth embodiment. With reference to FIG. 38, the ninth embodiment of the optical imaging lens 10 is substantially similar to the first embodiment, and the difference between the two is that, the optical data, the aspheric coefficients, and the parameters of the lens elements 1, 2, 3, 4, 5 and 6 in these embodiments are different to some extent. In addition, in the ninth embodiment, the periphery region 554 of the object-side surface 55 of the fifth lens element 5 is concave. For clear illustration, it should be noted that the same reference numbers of the optical axis regions and the periphery regions with shapes similar to those in the first embodiment are omitted in FIG. 38.

Detailed optical data of the optical imaging lens 10 of the ninth embodiment are shown in FIG. 40. In the optical imaging lens 10 of the ninth embodiment, an overall effective focal length (EFL) thereof is 2.151 millimeter (mm), a half field of view (HFOV) thereof is 58.519°, an F-number (Fno) thereof is 2.250, a system length (TTL) thereof is 4.897 mm and an image height thereof is 2.889 mm.

FIG. 41 shows the aspheric coefficients of the object-side surface 15 of the first lens element 1 to the image-side surface 66 of the sixth lens element 6 in Equation (1) according to the ninth embodiment.

In addition, the relationship among the important parameters in the optical imaging lens 10 of the ninth embodiment is shown in FIG. 47.

Figures 39A, 39B, 39C, 39D:
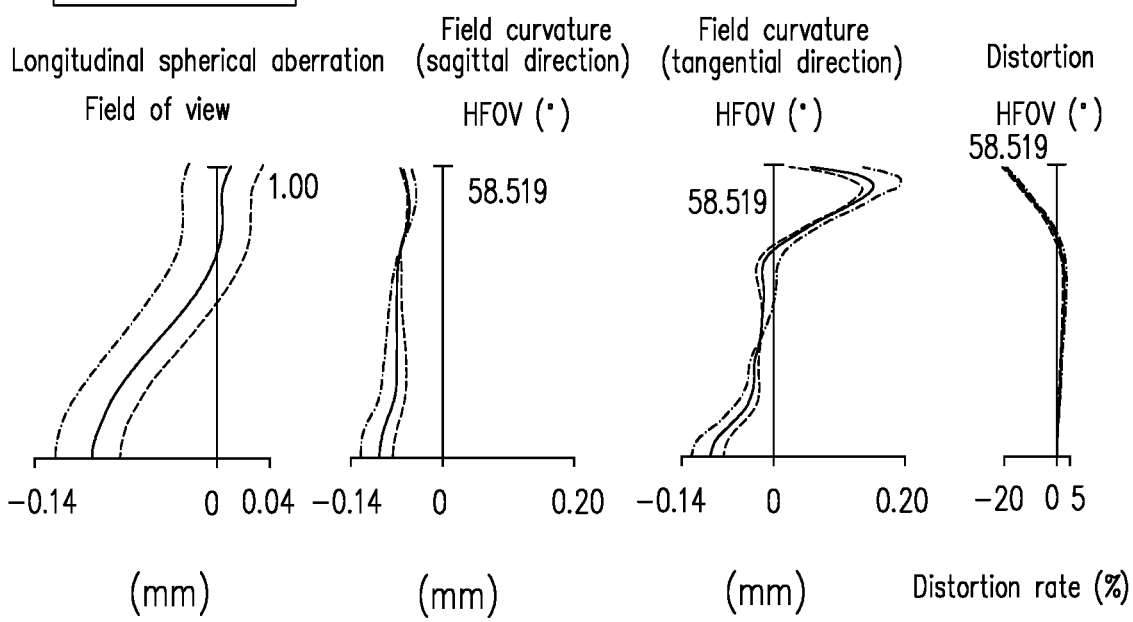
FIG. 39A to FIG. 39D are diagrams illustrating a longitudinal spherical aberration and other aberrations of the optical imaging lens according to the ninth embodiment.

In the diagram of FIG. 39A which illustrates the longitudinal spherical aberration when the pupil radius is 0.4745 mm according to the ninth embodiment, the imaging point deviation of the off-axis rays at different heights is controlled within a range of ±0.14 mm. In FIG. 39B and FIG. 39C which illustrate two diagrams of the field curvature aberrations, the field curvature aberrations of the three representative wavelengths in the entire field of view fall within a range of ±0.14 mm. In FIG. 39D, the diagram of distortion aberration shows that the distortion aberration in the ninth embodiment can be maintained within a range of ±20%. Accordingly, compared to the first embodiment, with the system length shortened to approximately 4.897 mm, the ninth embodiment can still provide favorable imaging quality.

In view of the above description, compared to the first embodiment, the advantage of the ninth embodiment lies in that, the system length of the ninth embodiment is less than the system length of the first embodiment, and the half field of view of the ninth embodiment is greater than the half field of view of the first embodiment.

Figure 42:
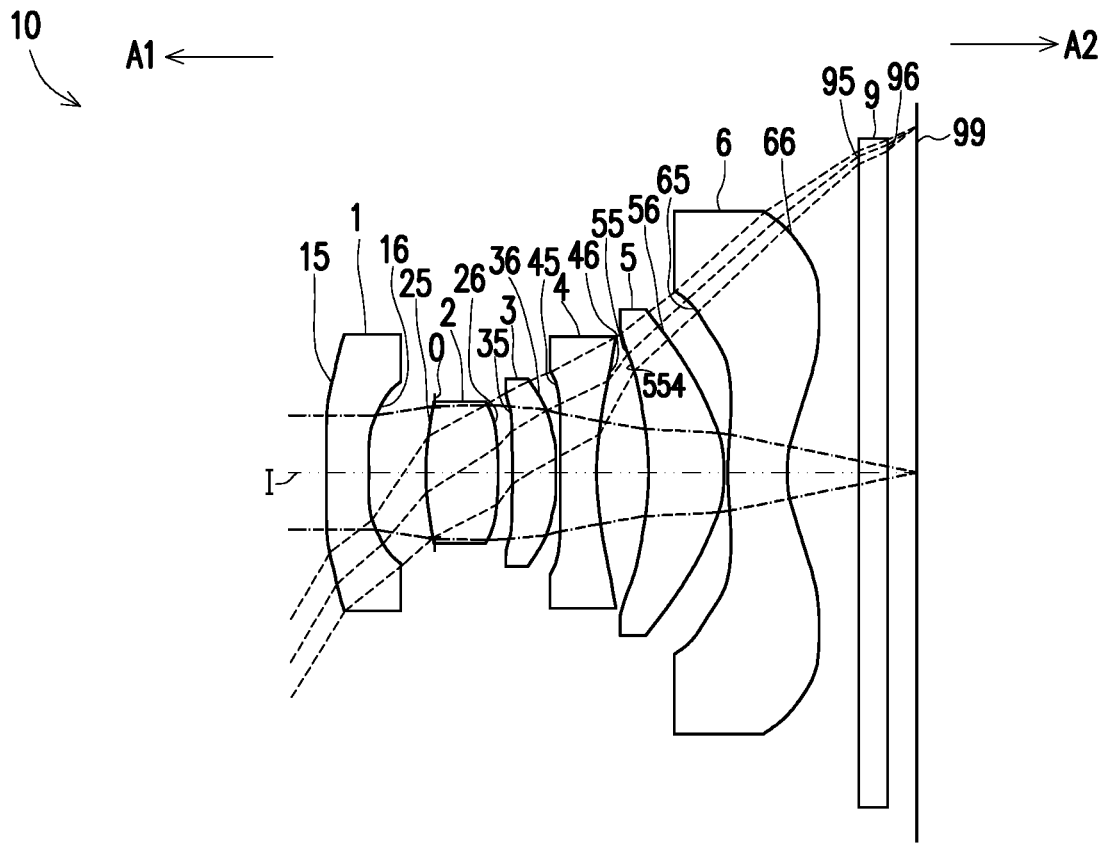
FIG. 42 is a schematic view illustrating an optical imaging lens according to a tenth embodiment of the invention.

FIG. 42 is a schematic view illustrating an optical imaging lens according to a tenth embodiment of the invention, and FIG. 43A to FIG. 43D are diagrams illustrating a longitudinal spherical aberration and other aberrations of the optical imaging lens according to the tenth embodiment. With reference to FIG. 42, the tenth embodiment of the optical imaging lens 10 is substantially similar to the first embodiment, and the difference between the two is that, the optical data, the aspheric coefficients, and the parameters of the lens elements 1, 2, 3, 4, 5 and 6 in these embodiments are different to some extent. In addition, in the tenth embodiment, the periphery region 554 of the object-side surface 55 of the fifth lens element 5 is concave. For clear illustration, it should be noted that the same reference numbers of the optical axis regions and the periphery regions with shapes similar to those in the first embodiment are omitted in FIG. 42.

Detailed optical data of the optical imaging lens 10 of the tenth embodiment are shown in FIG. 44. In the optical imaging lens 10 of the tenth embodiment, an overall effective focal length (EFL) thereof is 2.146 millimeter (mm), a half field of view (HFOV) thereof is 58.519°, an F-number (Fno) thereof is 2.250, a system length (TTL) thereof is 4.846 mm and an image height is 2.859 mm.

FIG. 45 shows the aspheric coefficients of the object-side surface 15 of the first lens element 1 to the image-side surface 66 of the sixth lens element 6 in Equation (1) according to the tenth embodiment.

In addition, the relationship among the important parameters in the optical imaging lens 10 of the tenth embodiment is shown in FIG. 47.

Figures 43A, 43B, 43C, 43D:
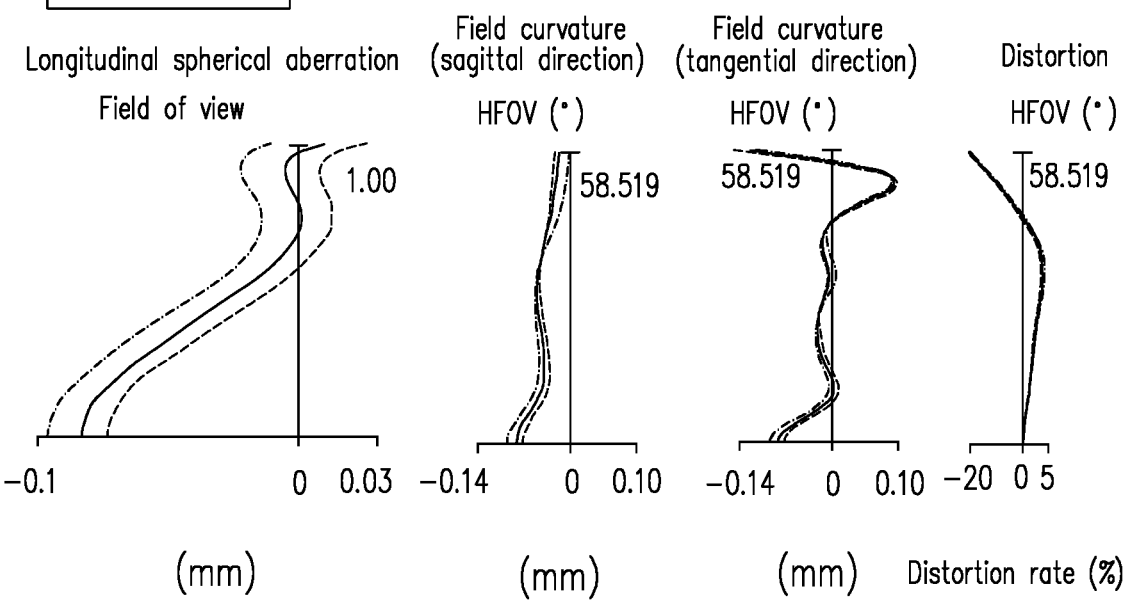
FIG. 43A to FIG. 43D are diagrams illustrating a longitudinal spherical aberration and other aberrations of the optical imaging lens according to the tenth embodiment.

In the diagram of FIG. 43A which illustrates the longitudinal spherical aberration when the pupil radius is 0.4768 mm according to the tenth embodiment, the imaging point deviation of the off-axis rays at different heights is controlled within a range of ±0.1 mm. In FIG. 43B and FIG. 43C which illustrate two diagrams of the field curvature aberrations, the field curvature aberrations of the three representative wavelengths in the entire field of view fall within a range of ±0.14 mm. In FIG. 43D, the diagram of distortion aberration shows that the distortion aberration in the tenth embodiment is maintained within a range of ±25%. Accordingly, compared to the first embodiment, with the system length shortened to approximately 4.846 mm, the tenth embodiment can still provide favorable imaging quality.

In view of the above description, compared to the first embodiment, the advantage of the tenth embodiment lies in that, the system length of the tenth embodiment is less than the system length of the first embodiment, and the half field of view of the tenth embodiment is greater than the half field of view of the first embodiment.

With reference to FIG. 46 and FIG. 47, FIG. 46 and FIG. 47 are table diagrams showing the optical parameters provided in the first embodiment to the tenth embodiment.

At least one of the purposes of satisfying the following condition expressions is to maintain the effective focal length and each optical parameter at appropriate values, so as to prevent the overall aberration correction of the optical imaging lens 10 from being affected by any overly large parameter, or prevent the assembly from being affected or the manufacturing difficulty from increased by any overly small parameter.

Herein,
the optical imaging lens 10 can comply with the condition expression of EFL/BFL≤2.600, and more preferably, can comply with the condition expression of 0.900≤EFL/BFL≤2.600.

The optical imaging lens 10 can comply with the condition expression of EFL/(T2+T6)≤2.800, and more preferably, can comply with the condition expression of 1.300≤EFL/(T2+T6)≤2.800.

The optical imaging lens 10 can comply with the condition expression of EFL/T5≤4.500, and more preferably, can comply with the condition expression of 1.700≤EFL/T5≤4.500.

At least one of the purposes of satisfying the following condition expressions is to maintain the thicknesses and the intervals of lens elements at appropriate values, so as to prevent the slimness of the optical imaging lens in whole from being affected by any overly large parameter, or prevent the assembly from being affected or the manufacturing difficulty from increased by any overly small parameter.

Herein,

The optical imaging lens 10 can comply with the condition expression of AAG/T1≤3.100, and more preferably, can comply with the condition expression of 1.500≤AAG/T1≤3.100.

The optical imaging lens 10 can comply with the condition expression of ALT/(G12+G23+G45)≤4.800, and more preferably, can comply with the condition expression of 1.700≤ALT/(G12+G23+G45)≤4.800.

The optical imaging lens 10 can comply with the condition expression of TTL/(G12+T5)≤5.600, and more preferably, can comply with the condition expression of 2.700≤TTL/(G12+T5)≤5.600.

The optical imaging lens 10 can comply with the condition expression of (T1+T3+G23)/T2≤2.000, and more preferably, can comply with the condition expression of 1.000≤(T1+T3+G23)/T2≤2.000.

The optical imaging lens 10 can comply with the condition expression of (T1+T4+G34)/T3≤3.500, and more preferably, can comply with the condition expression of 1.300≤(T1+T4+G34)/T3≤3.500.

The optical imaging lens 10 can comply with the condition expression of (T1+T3+G56)/T6≤2.550, and more preferably, can comply with the condition expression of 1.000≤(T1+T3+G56)/T6≤2.550.

The optical imaging lens 10 can comply with the condition expression of BFL/G12≤5.000, and more preferably, can comply with the condition expression of 1.300≤BFL/G12≤5.000.

The optical imaging lens 10 can comply with the condition expression of TL/(G12+T5)≤5.000, and more preferably, can comply with the condition expression of 2.100≤TL/(G12+T5)≤5.000.

The optical imaging lens 10 can comply with the condition expression of TTL/(T2+T5+T6)≤4.900, and more preferably, can comply with the condition expression of 2.100≤TTL/(T2+T5+T6)≤4.900.

The optical imaging lens 10 can comply with the condition expression of (T1+G34+G56)/(G23+G45)≤3.300, and more preferably, can comply with the condition expression of 0.600≤(T1+G34+G56)/(G23+G45)≤3.300.

The optical imaging lens 10 can comply with the condition expression of (T3+G34+G56)/(G23+G45)≤2.700, and more preferably, can comply with the condition expression of 0.600≤(T3+G34+G56)/(G23+G45)≤2.700.

The optical imaging lens 10 can comply with the condition expression of (T4+G34+G56)/(G23+G45)≤2.800, and more preferably, can comply with the condition expression of 0.500≤(T4+G34+G56)/(G23+G45)≤2.800.

In addition, lens limitations may be further added by using any combination relation of the parameters selected from the provided embodiments to implement the design for the lens with the same framework set forth in the embodiments of the invention. Due to the unpredictability in an optical system design, with the framework set forth in the invention, the shortened lens length, the enlarged aperture, the improved imaging quality, or the improved assembly yield can be achieved by the optical imaging lens 10 according to the embodiments of the invention to improve the shortcomings of the related art if at least one of the aforementioned conditions is satisfied.

The aforementioned limitation relational expressions are provided in an exemplary sense and can be selectively combined and applied to the embodiments of the invention in different manners; the invention should not be limited to the above examples. In implementation of the invention, apart from the above-described relational expressions, it is also possible to design additional detailed structures such as lens concave and convex curvatures arrangements for the lens elements so as to enhance control of system property and/or resolution. For instance, the optical axis region of the object-side surface 15 of the first lens element 1 may selectively be concave. It should be noted that the above-described details can be optionally combined and applied to the other embodiments of the invention under the condition where they are not in conflict with one another.

All of the numerical ranges including the maximum and minimum values and the values therebetween which are obtained from the combining proportion relation of the optical parameters disclosed in each embodiment of the invention are implementable.

To sum up, the optical imaging lens 10 described in the embodiments of the invention may have at least one of the following advantages and/or achieve at least one of the following effects.

1. The longitudinal spherical aberrations, the astigmatic aberrations, and the distortion aberrations provided in the embodiments of the invention all comply with usage specifications. Moreover, the off-axis rays of the three representative wavelengths of red, green and blue at different heights are all focused near the imaging point, and the skew margin of the curve of each wavelength shows that the imaging point deviation of the off-axis rays at different heights is under control to provide the capability of suppressing spherical aberrations, image aberrations, and distortion. With further examination upon the imaging quality data, inter-distances between the three representative wavelengths of red, green and blue are fairly close, which represents that light rays with different wavelengths in the embodiments of the invention can be well focused under different circumstances to provide the capability of suppressing dispersion. In summary, the embodiments of the invention can produce excellent image quality through design and mutual matching of the lenses.

2. It is advantageous to increase the half field of view of the optical imaging lens 10 by designing the first lens 1 to have negative refractive power. Light reception may be improved by designing the periphery region 153 of the object-side surface 15 of the first lens element 15 to be concave.

3. The optical imaging lens 10 according to the embodiments of the invention includes the following concave and convex designs for the shapes of the lenses. (1) The optical axis region 451 of the object-side surface 45 of the fourth lens element 4 is convex, or the condition expression (2): (T1+T2+G34+G45)/(G23+T5)≤2.400 is satisfied, or the condition expression (3): (T2+T3+G34+G45)/(G23+T4)≤6.000 is satisfied. Also, with a shape combination including the optical axis region 261 of the image-side surface 26 of the second lens element 2 being convex, the optical axis region 352 of the object-side surface 35 of the third lens element 3 being concave, and the periphery region 464 of the image-side surface 46 of the fourth lens element 4 being concave, it is advantageous to shorten the lens length. It is more preferable to limit the above condition expressions (2) and (3) to: 0.900≤(T1+T2+G34+G45)/(G23+T5)≤2.400 and 2.100≤(T2+T3+G34+G45)/(G23+T4)≤6.000.

4. The features of the periphery region 654 of the object-side surface 65 of the sixth lens element 6 being concave together with one of the object-side surface 65 and image-side surface 66 being the aspheric surface can facilitate correction on the lens aberration.

5. It is advantageous to correct the chromatic aberration of the optical imaging lens when the condition expression of: V4+V5+V6≤120.000 and the shape limitation are satisfied, and it is more preferable to limit said condition expression to: 60.000≤V4+V5+V6≤120.000.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical imaging lens, comprising a first lens element, a second lens element, a third lens element, a fourth lens element, a fifth lens element and a sixth lens element arranged in sequence from an object side to an image side along an optical axis, and each of the first lens element to the sixth lens element comprising an object-side surface facing the object side and allowing imaging rays to pass through and an image-side surface facing the image side and allowing the imaging rays to pass through;
  the first lens element having negative refracting power, a periphery region of the object-side surface of the first lens element being convex;
  an optical axis region of the image-side surface of the second lens element being convex;
  an optical axis region of the object-side surface of the third lens element being concave;
  an optical axis region of the object-side surface of the fourth lens element being convex, a periphery region of the image-side surface of the fourth lens element being concave,
  the optical imaging lens only comprising abovementioned six lens elements having refracting power, the optical imaging lens satisfying the following condition expression:

$V4+V5+V6 \le 120.000$, wherein V4 is an Abbe number of the fourth lens element, V5 is an Abbe number of the fifth lens element, and V6 is an Abbe number of the sixth lens element.

2. The optical imaging lens as recited in claim 1, wherein one of the object-side surface of the sixth lens element and the image-side surface of the sixth lens element is an aspheric surface.

3. The optical imaging lens as recited in claim 1, wherein the optical imaging lens further satisfies the following condition expression: EFL/BFL≤2.600, EFL is an effective focal length of the optical imaging lens, and BFL is a distance from the image-side surface of the sixth lens element to an image plane along the optical axis.

4. The optical imaging lens as recited in claim 1, wherein the optical imaging lens further satisfies the following condition expression: AAG/T1≤3.100, AAG is a sum of five air gaps of the first lens element to the sixth lens element along the optical axis, and T1 is a thickness of the first lens element along the optical axis.

5. The optical imaging lens as recited in claim 1, wherein the optical imaging lens further satisfies the following condition expression: (T1+T3+G23)/T2≤2.000, wherein T1 is a thickness of the first lens element along the optical axis, T3 is a thickness of the third lens element along the optical axis, G23 is an air gap between the second lens element and the third lens element along the optical axis, and T2 is a thickness of the second lens element along the optical axis.

6. The optical imaging lens as recited in claim 1, wherein the optical imaging lens further satisfies the following condition expression: BFL/G12≤5.000, BFL is a distance from the image-side surface of the sixth lens element to an image plane along the optical axis, and G12 is an air gap between the first lens element and the second lens element along the optical axis.

7. The optical imaging lens as recited in claim 1, wherein the optical imaging lens further satisfies the following condition expression: (T1+G34+G56)/(G23+G45)≤3.300, wherein T1 is a thickness of the first lens element along the optical axis, G34 is an air gap between the third lens element and the fourth lens element along the optical axis, G56 is an air gap between the fifth lens element and the sixth lens element along the optical axis, G23 is an air gap between the second lens element and the third lens element along the optical axis, and G45 is an air gap between the fourth lens element and the fifth lens element along the optical axis.

8. An optical imaging lens, comprising a first lens element, a second lens element, a third lens element, a fourth lens element, a fifth lens element and a sixth lens element arranged in sequence from an object side to an image side along an optical axis, and each of the first lens element to the sixth lens element comprising an object-side surface facing the object side and allowing imaging rays to pass through and an image-side surface facing the image side and allowing the imaging rays to pass through;
  the first lens element having negative refracting power;
  an optical axis region of the image-side surface of the second lens element being convex;
  an optical axis region of the object-side surface of the third lens element being concave;
  a periphery region of the image-side surface of the fourth lens element being concave;
  wherein the optical imaging lens only comprises abovementioned six lens elements having refracting power, the optical imaging lens satisfying the following condition expressions:

$V4+V5+V6 \le 120.000$; and $(T1+T2+G34+G45)/(G23+T5) \le 2.400$, wherein V4 is an Abbe number of the fourth lens element, V5 is an Abbe number of the fifth lens element, V6 is an Abbe number of the sixth lens element, T1 is a thickness of the first lens element along the optical axis, T2 is a thickness of the second lens element along the optical axis, G34 is an air gap between the third lens element and the fourth lens element along the optical axis, G45 is an air gap between the fourth lens element and the fifth lens element along the optical axis, G23 is an air gap between the second lens element and the third lens element along the optical axis, and T5 is a thickness of the fifth lens element along the optical axis.

9. The optical imaging lens as recited in claim 8, wherein a periphery region of the object-side surface of the sixth lens element is concave.

10. The optical imaging lens as recited in claim 8, wherein the optical imaging lens further satisfies the following condition expression: EFL/(T2+T6)≤2.800, wherein EFL is an effective focal length of the optical imaging lens, and T6 is a thickness of the sixth lens element along the optical axis.

11. The optical imaging lens as recited in claim 8, wherein the optical imaging lens further satisfies the following condition expression: ALT/(G12+G23+G45)≤4.800, wherein ALT is a sum of six lens thicknesses of the first lens element to the sixth lens element along the optical axis, and G12 is an air gap between the first lens element and the second lens element along the optical axis.

12. The optical imaging lens as recited in claim 8, wherein the optical imaging lens further satisfies the following condition expression: (T1+T4+G34)/T3≤3.500, wherein T4 is a thickness of the fourth lens element along the optical axis, and T3 is a thickness of the third lens element along the optical axis.

13. The optical imaging lens as recited in claim 8, wherein the optical imaging lens further satisfies the following condition expression: TL/(G12+T5)≤5.000, wherein TL is a distance from the object-side surface of the first lens element to the image-side surface of the sixth lens element along the optical axis, and G12 is an air gap between the first lens element and the second lens element along the optical axis.

14. The optical imaging lens as recited in claim 8, wherein the optical imaging lens further satisfies the following condition expression: (T3+G34+G56)/(G23+G45)≤2.700, wherein T3 is a thickness of the third lens element along the optical axis, and G56 is an air gap between the fifth lens element and the sixth lens element along the optical axis.

15. An optical imaging lens, comprising a first lens element, a second lens element, a third lens element, a fourth lens element, a fifth lens element and a sixth lens element arranged in sequence from an object side to an image side along an optical axis, and each of the first lens element to the sixth lens element comprising an object-side surface facing the object side and allowing imaging rays to pass through and an image-side surface facing the image side and allowing the imaging rays to pass through;
the first lens element having negative refracting power;
an optical axis region of the image-side surface of the second lens element being convex;
an optical axis region of the object-side surface of the third lens element being concave;
a periphery region of the image-side surface of the fourth lens element being concave;
wherein the optical imaging lens only comprises above-mentioned six lens elements having refracting power, the optical imaging lens satisfying the following condition expressions:

$V4+V5+V6 \leq 120.000$; and $(T2+T3+G34+G45)/(G23+T4) \leq 6.000$, wherein V4 is an Abbe number of the fourth lens element, V5 is an Abbe number of the fifth lens element, V6 is an Abbe number of the sixth lens element, T2 is a thickness of the second lens element along the optical axis, T3 is a thickness of the third lens element along the optical axis, G34 is an air gap between the third lens element and the fourth lens element along the optical axis, G45 is an air gap between the fourth lens element and the fifth lens element along the optical axis, G23 is an air gap between the second lens element and the third lens element along the optical axis, and T4 is a thickness of the fourth lens element along the optical axis.

16. The optical imaging lens as recited in claim 15, wherein the optical imaging lens further satisfies the following condition expression: EFL/T5≤4.500, wherein EFL is an effective focal length of the optical imaging lens, and T5 is a thickness of the fifth lens element along the optical axis.

17. The optical imaging lens as recited in claim 15, wherein the optical imaging lens further satisfies the following condition expression: TTL/(G12+T5)≤5.600, wherein TTL is a distance from the object-side surface of the first lens element to an image plane along the optical axis, G12 is an air gap between the first lens element and the second lens element along the optical axis, and T5 is a thickness of the fifth lens element along the optical axis.

18. The optical imaging lens as recited in claim 15, wherein the optical imaging lens further satisfies the following condition expression: (T1+T3+G56)/T6≤2.550, wherein T1 is a thickness of the first lens element along the optical axis, G56 is an air gap between the fifth lens element and the sixth lens element along the optical axis, and T6 is a thickness of the sixth lens element along the optical axis.

19. The optical imaging lens as recited in claim 15, wherein the optical imaging lens further satisfies the following condition expression: TTL/(T2+T5+T6)≤4.900, wherein TTL is a distance from the object-side surface of the first lens element to an image plane along the optical axis, T5 is a thickness of the fifth lens element along the optical axis, and T6 is a thickness of the sixth lens element along the optical axis.

20. The optical imaging lens as recited in claim 15, wherein the optical imaging lens further satisfies the following condition expression: (T4+G34+G56)/(G23+G45)≤2.800, wherein G56 is the air gap between the fifth lens element and the sixth lens element along the optical axis.

* * * * *